(12) United States Patent
Hart, III et al.

(10) Patent No.: US 7,376,073 B2
(45) Date of Patent: May 20, 2008

(54) OPTICAL STORAGE MEDIUM HAVING DISTORTION REGIONS, AND A METHOD OF MODIFYING AN OPTICAL STORAGE MEDIUM TO INCLUDE DISTORTION REGIONS

(75) Inventors: John J. Hart, III, Mashpee, MA (US); Richard B. LeVine, Marstons Mills, MA (US); Andrew R. Lee, Marlborough, MA (US); Daniel G. Howard, Mashpee, MA (US)

(73) Assignee: ECD Systems, Inc., Marstons Mills, MA (US)

( * ) Notice: Subject to any disclaimer, the term of this patent is extended or adjusted under 35 U.S.C. 154(b) by 69 days.

(21) Appl. No.: 10/023,424

(22) Filed: Dec. 12, 2001

(65) Prior Publication Data

US 2002/0114265 A1  Aug. 22, 2002

Related U.S. Application Data

(60) Provisional application No. 60/255,653, filed on Dec. 14, 2000.

(51) Int. Cl.
*G11B 7/24* (2006.01)
(52) U.S. Cl. .................................. 369/275.5; 428/64.1
(58) Field of Classification Search ............ 369/275.5, 369/275.1, 272, 27.3, 30.05, 47.12, 53.21, 369/283, 286, 284, 285; 428/64.1, 64.4; 430/320, 321
See application file for complete search history.

(56) References Cited

U.S. PATENT DOCUMENTS

| 4,168,396 A | 9/1979 | Best ............................ 178/22 |
| 4,176,247 A | 11/1979 | Englund ..................... 178/22 |
| 4,223,050 A | 9/1980 | Nyfeler et al. .............. 427/163 |
| 4,246,638 A | 1/1981 | Thomas ...................... 364/200 |
| 4,263,634 A | 4/1981 | Chenoweth et al. ........ 360/133 |
| 4,279,852 A | 7/1981 | Engelmann ................. 264/227 |

(Continued)

FOREIGN PATENT DOCUMENTS

DE  196 02 804 A1  7/1997

(Continued)

OTHER PUBLICATIONS

"Method for Determining Compact Disk-Disk-Read Only Memory Quality During Verify," IBM Technical Disclosure Bulletin, Feb. 1997, pp. 217-218.

*Primary Examiner*—Tan Dinh
(74) *Attorney, Agent, or Firm*—Mills & Onello LLP

(57) ABSTRACT

Theft, distribution, and piracy of digital content on optical media (software, video, audio, e-books, any content of any kind that is digitally stored and distributed) is often accomplished by copying it directly to another disc using commonly available copy tools and recordable optical media, or the copying of media to another mass manufactured disc. Methods which cause the copy process to become lengthy and inconvenient, or which produce copies that are significantly measurably different from the original and therefore be recognizable as copies, deter or prevent an unauthorized individual from making copies. This is accomplished by modifying the optical path of an optical medium to include regions of selective distortion. This, in turn, modifies the read operation of the data in the regions, which can be used to identify and authenticate the medium.

80 Claims, 13 Drawing Sheets

U.S. PATENT DOCUMENTS

| | | | |
|---|---|---|---|
| 4,333,113 A | 6/1982 | Kalinowski | 360/27 |
| 4,335,173 A | 6/1982 | Caraballo | 428/65 |
| 4,336,981 A | 6/1982 | Mori | 350/358 |
| 4,433,207 A | 2/1984 | Best | 178/22.09 |
| 4,446,519 A | 5/1984 | Thomas | 364/300 |
| 4,453,074 A | 6/1984 | Weinstein | 235/380 |
| 4,454,594 A | 6/1984 | Heffron et al. | 364/900 |
| 4,458,315 A | 7/1984 | Uchenick | 364/200 |
| 4,462,076 A | 7/1984 | Smith, III | 364/200 |
| 4,465,901 A | 8/1984 | Best | 178/22.08 |
| 4,471,163 A | 9/1984 | Donald et al. | 178/22.08 |
| 4,479,579 A | 10/1984 | Miklos | 206/309 |
| 4,495,526 A | 1/1985 | Baranoff-Rossine | 360/15 |
| 4,510,508 A | 4/1985 | Janssen | 346/135.1 |
| 4,513,174 A | 4/1985 | Herman | 178/22.08 |
| 4,528,588 A | 7/1985 | Lofberg | 358/122 |
| 4,558,176 A | 12/1985 | Arnold et al. | 178/22.08 |
| 4,573,119 A | 2/1986 | Westheimer et al. | 364/200 |
| 4,577,289 A | 3/1986 | Comerford et al. | 364/900 |
| 4,584,641 A | 4/1986 | Guglielmino | 364/200 |
| 4,590,470 A | 5/1986 | Koenig | 340/825.31 |
| 4,593,353 A | 6/1986 | Pickholtz | 364/200 |
| 4,595,950 A | 6/1986 | Lofberg | 358/122 |
| 4,634,807 A | 1/1987 | Chorley et al. | 178/22.08 |
| 4,644,493 A | 2/1987 | Chandra et al. | 364/900 |
| 4,649,233 A | 3/1987 | Bass et al. | 380/21 |
| 4,652,990 A | 3/1987 | Pailen et al. | 364/200 |
| 4,658,093 A | 4/1987 | Hellman | 380/25 |
| 4,670,857 A | 6/1987 | Rackman | 380/4 |
| 4,677,604 A | 6/1987 | Selby et al. | 369/33 |
| 4,683,553 A | 7/1987 | Mollier | 380/4 |
| 4,683,968 A | 8/1987 | Appelbaum et al. | 380/4 |
| 4,685,055 A | 8/1987 | Thomas | 364/200 |
| 4,695,993 A | 9/1987 | Takagi et al. | 369/54 |
| 4,698,695 A | 10/1987 | Kosaka et al. | 358/338 |
| 4,724,492 A | 2/1988 | Kosaka et al. | 358/342 |
| 4,734,796 A | 3/1988 | Grynberg et al. | 360/60 |
| 4,740,890 A | 4/1988 | William | 364/200 |
| 4,742,543 A | 5/1988 | Frederiksen | 380/9 |
| 4,747,139 A | 5/1988 | Taaffe | 380/44 |
| 4,752,554 A | 6/1988 | Sato et al. | 430/273 |
| 4,757,468 A | 7/1988 | Domenik et al. | 364/900 |
| 4,757,534 A | 7/1988 | Matyas et al. | 380/25 |
| 4,761,775 A | 8/1988 | Murakami | 369/46 |
| 4,785,361 A | 11/1988 | Brotby | 360/60 |
| 4,796,181 A | 1/1989 | Wiedemer | 364/406 |
| 4,796,220 A | 1/1989 | Wolfe | 364/900 |
| 4,800,548 A | 1/1989 | Koishi et al. | 369/54 |
| 4,839,883 A | 6/1989 | Nagata et al. | 369/286 |
| 4,849,836 A | 7/1989 | Kachikian | 360/60 |
| 4,849,927 A | 7/1989 | Vos | 364/900 |
| 4,858,036 A | 8/1989 | Ginkel | 360/60 |
| 4,866,769 A | 9/1989 | Karp | 380/4 |
| 4,868,805 A | 9/1989 | Hanami et al. | 369/53 |
| 4,879,704 A | 11/1989 | Takagi et al. | 369/14 |
| 4,891,504 A | 1/1990 | Gupta | 235/462 |
| 4,893,883 A | 1/1990 | Satzler | 305/10 |
| 4,903,296 A | 2/1990 | Chandra et al. | 380/4 |
| 4,907,216 A | 3/1990 | Rijnsburger | 369/275 |
| 4,910,725 A | 3/1990 | Drexler et al. | 369/275 |
| 4,942,565 A | 7/1990 | Lagadec | 369/59 |
| 4,949,331 A | 8/1990 | Maeda et al. | 369/275.3 |
| 4,959,861 A | 9/1990 | Howlette | 380/4 |
| 4,961,182 A | 10/1990 | Saito et al. | 369/124 |
| 4,967,403 A | 10/1990 | Ogawa et al. | 369/44.26 |
| 4,975,898 A | 12/1990 | Yoshida | 369/100 |
| 4,980,782 A | 12/1990 | Ginkel | 360/60 |
| 4,991,163 A | 2/1991 | Tokushuku et al. | 369/275.4 |
| 5,004,232 A | 4/1991 | Wong et al. | 273/435 |
| 5,027,396 A | 6/1991 | Platteter et al. | 380/4 |
| 5,060,219 A | 10/1991 | Lokhoff et al. | 369/48 |
| 5,065,429 A | 11/1991 | Lang | 380/25 |
| 5,073,925 A | 12/1991 | Nagata et al. | 380/3 |
| 5,122,912 A | 6/1992 | Kanota et al. | 360/46 |
| 5,150,339 A | 9/1992 | Ueda et al. | 369/32 |
| 5,153,861 A | 10/1992 | Maeda et al. | 369/32 |
| 5,155,768 A | 10/1992 | Matsuhara | 380/23 |
| 5,159,633 A | 10/1992 | Nakamura | 380/30 |
| 5,168,482 A | 12/1992 | Aratani et al. | 369/13 |
| 5,179,547 A | 1/1993 | Komaki et al. | 369/275.4 |
| 5,191,611 A | 3/1993 | Lang | 380/25 |
| 5,204,152 A | 4/1993 | Yoshizawa | 428/64 |
| 5,224,087 A | 6/1993 | Maeda et al. | 369/54 |
| 5,243,423 A | 9/1993 | DeJean et al. | 358/142 |
| 5,255,007 A | 10/1993 | Bakx | 346/1.1 |
| 5,267,311 A | 11/1993 | Bakhoum | 380/4 |
| 5,276,738 A | 1/1994 | Hirsch | 380/46 |
| 5,285,440 A | 2/1994 | Matsuda | 369/275.3 |
| 5,306,349 A | 4/1994 | Nee | 134/1 |
| 5,312,663 A | 5/1994 | Kosinski et al. | 428/64 |
| 5,323,367 A | 6/1994 | Tamura et al. | 369/32 |
| 5,350,923 A | 9/1994 | Bassignana et al. | 250/453.11 |
| 5,371,792 A | 12/1994 | Asai et al. | 380/3 |
| 5,379,433 A | 1/1995 | Yamagishi | 395/725 |
| 5,392,351 A | 2/1995 | Hasebe et al. | 380/4 |
| 5,400,319 A | 3/1995 | Fite et al. | 369/275.5 |
| 5,400,403 A | 3/1995 | Fahn et al. | 380/21 |
| 5,410,527 A | 4/1995 | Ashinuma | 369/50 |
| 5,412,718 A | 5/1995 | Narasimhalu et al. | 380/4 |
| 5,418,852 A | 5/1995 | Itami et al. | 380/4 |
| 5,424,102 A | 6/1995 | Mizukuki et al. | 427/510 |
| 5,430,281 A | 7/1995 | Lentz et al. | 235/454 |
| 5,430,284 A | 7/1995 | Numazaki | 235/462 |
| 5,457,668 A | 10/1995 | Hibino et al. | 369/32 |
| 5,457,746 A | 10/1995 | Dolphin | 380/4 |
| 5,463,604 A | 10/1995 | Naito | 369/50 |
| 5,473,584 A | 12/1995 | Oshima | 369/32 |
| 5,475,664 A | 12/1995 | Shimzume et al. | 369/44.29 |
| 5,489,768 A | 2/1996 | Brownstein et al. | 235/414 |
| 5,513,169 A | 4/1996 | Fite et al. | 369/272 |
| 5,513,260 A | 4/1996 | Ryan | 380/3 |
| 5,538,773 A | 7/1996 | Kondo | 428/64.1 |
| 5,541,904 A | 7/1996 | Fite et al. | 369/58 |
| 5,552,098 A | 9/1996 | Kudo et al. | 264/106 |
| 5,563,947 A | 10/1996 | Kikinis | 380/4 |
| 5,569,522 A * | 10/1996 | Steininger et al. | 428/195.1 |
| 5,570,339 A | 10/1996 | Nagano | 369/275.3 |
| 5,572,507 A | 11/1996 | Ozaki et al. | 369/275.4 |
| 5,579,113 A | 11/1996 | Papst et al. | 356/426 |
| 5,587,984 A | 12/1996 | Owa et al. | 369/103 |
| 5,590,111 A | 12/1996 | Kirino et al. | 369/116 |
| 5,596,639 A | 1/1997 | Kikinis | 380/4 |
| 5,661,703 A | 8/1997 | Moribe et al. | 369/14 |
| 5,696,757 A | 12/1997 | Ozaki et al. | 369/275.4 |
| 5,698,833 A | 12/1997 | Skinger | 235/462 |
| 5,703,858 A | 12/1997 | Mitchell et al. | 369/58 |
| 5,706,047 A | 1/1998 | Lentz et al. | 347/262 |
| 5,706,266 A | 1/1998 | Brownstein et al. | 369/58 |
| 5,708,649 A | 1/1998 | Kamoto et al. | 369/275.3 |
| 5,714,935 A | 2/1998 | Ryan, Jr. | 340/572 |
| 5,719,937 A | 2/1998 | Warren et al. | 380/4 |
| 5,724,327 A | 3/1998 | Timmermans et al. | 369/48 |
| 5,737,286 A | 4/1998 | Timmermans et al. | 369/44.13 |
| 5,754,649 A | 5/1998 | Ryan et al. | 380/4 |
| 5,761,301 A | 6/1998 | Oshima et al. | 380/4 |
| 5,770,348 A | 6/1998 | Kondo | 430/321 |
| 5,799,145 A | 8/1998 | Imai et al. | 395/188.01 |
| 5,805,551 A | 9/1998 | Oshima et al. | 369/59 |
| 5,807,640 A | 9/1998 | Ueno et al. | 428/64.1 |
| 5,809,006 A * | 9/1998 | Davis et al. | 369/47.49 |
| 5,812,501 A | 9/1998 | Moribe et al. | 369/14 |
| 5,815,484 A * | 9/1998 | Smith et al. | 369/275.1 |
| 5,818,812 A | 10/1998 | Moribe et al. | 369/275.1 |
| 5,822,291 A | 10/1998 | Brindze et al. | 369/94 |

| | | | | | | |
|---|---|---|---|---|---|---|
| 5,826,156 A | 10/1998 | Natsume et al. ............ 399/389 | 6,733,950 B2 | 5/2004 | Breitung et al. | |
| 5,875,156 A | 2/1999 | Ito et al. ...................... 369/32 | 6,747,930 B1 * | 6/2004 | Weldon et al. ........... 369/53.21 | |
| 5,881,038 A | 3/1999 | Oshima et al. ............... 369/59 | 6,775,227 B2 | 8/2004 | Watanabe et al. ........ 369/275.3 | |
| 5,886,979 A | 3/1999 | Moribe et al. ............ 369/275.3 | 6,826,137 B1 | 11/2004 | Lee et al. | |
| 5,905,798 A | 5/1999 | Nerlikar et al. ................ 380/3 | 6,838,145 B2 | 1/2005 | Drew et al. | |
| 5,930,209 A | 7/1999 | Spitzenberger et al. ....... 369/32 | 2001/0024411 A1 | 9/2001 | Pirot et al. ................ 369/53.21 | |
| 5,930,210 A | 7/1999 | Timmermans et al. ... 369/44.13 | 2002/0001690 A1 | 1/2002 | Selinfreund et al. | |
| 5,959,954 A | 9/1999 | Yamamuro .................... 369/47 | 2002/0048225 A1 | 4/2002 | Shinoda .................... 369/13.05 | |
| 5,960,398 A | 9/1999 | Fuchigami et al. .......... 704/270 | 2002/0069389 A1 | 6/2002 | Sollish et al. ............... 714/758 | |
| 5,963,909 A | 10/1999 | Warren et al. ................. 705/1 | 2002/0142248 A1 | 10/2002 | Dubois et al. ......... 430/270.15 | |
| 6,011,765 A | 1/2000 | Nishio .......................... 369/59 | 2002/0181369 A1 | 12/2002 | Yeo | |
| 6,011,772 A * | 1/2000 | Rollhaus et al. ............ 369/286 | 2003/0072447 A1 | 4/2003 | Saliahov ..................... 380/229 | |
| 6,029,259 A | 2/2000 | Sollish et al. ............... 714/719 | 2003/0147339 A1 | 8/2003 | Selinfreund et al. | |
| 6,052,465 A | 4/2000 | Gotoh et al. ................... 380/4 | 2004/0223428 A1 * | 11/2004 | Hart et al. ................ 369/47.13 | |
| 6,101,476 A | 8/2000 | Kamatakis et al. ............ 705/1 | 2005/0025314 A1 * | 2/2005 | Van Der Veen et al. .... 380/254 | |
| 6,104,679 A | 8/2000 | Sollish ........................ 369/33 | 2005/0050343 A1 | 3/2005 | Selinfreund et al. .......... 713/193 | |
| 6,108,296 A | 8/2000 | Kajiyama et al. ......... 369/275.4 | 2005/0063256 A1 | 3/2005 | Selinfreund et al. | |
| 6,122,739 A | 9/2000 | Kutaragi et al. ............. 713/200 | 2005/0083829 A1 | 4/2005 | Selinfreund et al. | |
| 6,167,136 A | 12/2000 | Chou .......................... 380/201 | 2005/0084645 A1 | 4/2005 | Selinfreund et al. | |
| 6,204,981 B1 | 3/2001 | Ogino et al. .................. 360/60 | 2005/0153109 A1 | 7/2005 | Drew et al. | |
| 6,226,244 B1 | 5/2001 | Timmermans et al. ........ 369/48 | 2006/0023600 A1 | 2/2006 | Selinfreund et al. | |
| 6,262,967 B1 | 7/2001 | Kajiyama et al. ......... 369/275.4 | | | | |
| 6,285,764 B1 | 9/2001 | Gotoh et al. ................. 380/203 | | FOREIGN PATENT DOCUMENTS | | |
| 6,298,138 B1 | 10/2001 | Gotoh et al. ................. 380/203 | | | | |
| 6,304,971 B1 | 10/2001 | Kutaragi et al. ............. 713/200 | DE | 198 42 392 | 9/1998 | |
| 6,311,305 B1 | 10/2001 | Sollish et al. ............... 714/784 | EP | 0 731 454 A1 | 9/1996 | |
| 6,338,933 B1 * | 1/2002 | Lawandy et al. ......... 430/270.1 | EP | WP 98/41979 | 9/1998 | |
| 6,366,969 B1 | 4/2002 | Hanson ....................... 710/52 | EP | 0987705 | 9/1999 | |
| 6,425,098 B1 * | 7/2002 | Sinquin et al. ............. 714/699 | JP | 08 096262 A | 9/1994 | |
| 6,452,885 B1 * | 9/2002 | Yeo ........................ 369/53.21 | JP | 08096508 | 9/1994 | |
| 6,477,124 B2 | 11/2002 | Carson ..................... 369/53.21 | WO | WO 96/21928 A | 7/1996 | |
| 6,532,201 B1 * | 3/2003 | Hogan ..................... 369/53.21 | WO | WO98/08180 | 2/1998 | |
| 6,589,626 B2 | 7/2003 | Selinfreund et al. | WO | WO 99/67085 | 12/1999 | |
| 6,631,108 B1 | 10/2003 | Hogan ..................... 369/53.35 | WO | WO 02/02301 A1 | 1/2002 | |
| 6,638,593 B2 | 10/2003 | Selinfreund et al. | WO | WO 02/03106 | 1/2002 | |
| 6,641,886 B1 * | 11/2003 | Bakos et al. ................ 428/64.1 | WO | WO 02/03386 | 1/2002 | |
| 6,654,331 B1 | 11/2003 | Wilson et al. ............ 369/53.34 | | | | |
| 6,718,501 B1 | 4/2004 | Brody et al. ................ 714/752 | * cited by examiner | | | |

OPTICAL STORAGE MEDIUM HAVING DISTORTION REGIONS, AND A METHOD OF MODIFYING AN OPTICAL STORAGE MEDIUM TO INCLUDE DISTORTION REGIONS

RELATED APPLICATIONS

This application claims the benefit of U.S. Provisional Application No. 60/255,653, filed Dec. 14, 2000, the contents of which are incorporated herein by reference, in their entirety.

BACKGROUND OF THE INVENTION

1. Field of the Invention

This invention is related to the field of systems and methods for preventing and/or deterring the unauthorized duplication of digital information, for example, digital information having originally been distributed on optical media.

2. Description of the Related Art

The electronic publishing industry, which publishes application software, computer games, appliance-console games, movies, and music on optical media is facing a growing and serious problem; namely, the piracy, unauthorized modification, and use of content. Since digital content itself is in essence a sequence of binary 1's and 0's, it may often be copied exactly, wherein a copy of these "bits" is identical in every way to the original, and since the tools to do so are increasingly available, the industry is facing ever-increasing losses. Such losses may include the unauthorized duplication of a unit of optical media containing a game, a word processing program, an E-Book, a movie, or musical content.

There are a number of mechanisms available that may be used to limit or prevent unauthorized access to digital content, and many approaches related to optical media manufacturing, modification, and protection thereof. The most popular among these methods include methods that insert data errors into the media at the time of manufacture by producing actual bit patterns that are technically out of conformance with published standards and specifications (such as those set by Philips Corporation in their CD specification documents sometimes referred to as the "Redbook", "OrangeBook", and other industry-standards-book names), and therefore in theory cannot be reproduced by copying processes or devices if those devices or processes are themselves specification conformant. However, such approaches are limited in that they do not take into account that while these bit patterns are not officially sanctioned and not specification conformant, that is a matter of unenforceable voluntary specification compliance. Even as recently as a few years ago most device manufacturers were in fact trying very hard to be specification conformant, and most copy software was also conformant, so these protective inventions were effective for a period of time, until a realization was made that by making minor changes to devices and software, they could be made to copy nearly everything, even protected titles. This resulted in sales of more devices, more copying software, and of course more blank media, and such devices are not in any way illegal. Certain usage is, but that is the responsibility of the purchaser. A slippery slope of sorts, but piracy is ubiquitous and part of the reason why is that many segments of industry and society derive financial benefit from the act of piracy. Devices have intentionally been created which ignore these specification deviations, as have software programs dedicated to copying media such as the popular "BlindRead" and "CloneCD" software products. Examples of devices which deviate from the specifications are for example CD-R and CD-RW drives manufactured under the name "Lite-On" or "Liteon", or devices made by industry giant "Plextor", which are engineered to copy and reproduce all bits on a disc exactly, even those which do not conform to the specifications. Since the methods mentioned above rely on conformance to specifications and on industry consortia applying pressure to manufacturers and software companies to cause them to comply with the specifications, they are inherently flawed, because any number of such companies can, and have, carved themselves a perfectly legal market niche by doing just the opposite. If copying something is physically possible, then it will be copied and distributed. This is the significant challenge faced in this field; to create media that is inherently difficult or impossible to copy exactly in a manner that does not depend on voluntary compliance across a broad set of industries.

SUMMARY OF THE INVENTION

The present invention is directed to systems and methods for preventing and/or deterring the unauthorized duplication of digital information of all types, for example, digital information having been originally distributed on optical media of all types. In particular this invention is related to systems and methods that prevent or deter duplication and/or subsequent use of such unauthorized copies via optical media devices such as those as found on computer systems and consumer-appliance systems. Prevention includes making the copy process inaccurate or making it impossible to complete successfully. Deterrence includes slowing the process of copying to the point where many or most such perpetrators will give up, or where the process becomes cost or time ineffective, or where the process may require very specialized hardware (such as specific models and versions of optical media drives) to even be considered.

The devices referred to as read or read/write devices in this context include Compact Disc (CD, CD-R, CD-RW), DVD (all types including DVD-R and DVD-RW), other multi-layer and/or multi-sided media, or any other optical media devices and media as used on such systems.

The systems and methods of the present invention result in optical media discs that hinder such duplication by making the resultant output disc an inaccurate, or less accurate, copy, and/or increasing the difficulty and/or time required to create an accurate duplicate of an original disc, and further such discs may be enhanced by a corresponding authentication ability in software or firmware to more accurately detect whether a disc is such an original or duplicate, thus increasing the necessity of accurate duplication of the media if one were to attempt to make an unauthorized copy. Note that the distinction between firmware and software in the foregoing is generally intended to divide across two subsets of media uses. For media containing executable content (like software or games) any protective logic or algorithm content may be located on the media itself and may be executed as part of the execution of the digital content product. In the case of references to firmware, the system of the present invention may include an authentication component resident in the firmware of a device (such as a consumer audio playback CD player from a stereo system) which can determine if the media is authentic before allowing its usage.

Optical media are generally designed to have single or multiple surfaces with appropriate optical qualities (transparency to specific frequencies, filtration of others, birefringence, distortion, etc.) through which the underlying data may be read by an appropriate optical media read or read/write device. The goal of most optical media manufacturing processes is generally to create media with consistent optical and data integrity qualities in order to conform to the appropriate media specifications, in order to ensure broad compatibility across the majority of optical drives, so that the end consumer can reliably use such media in all appropriate devices.

The present invention involves the modification of such optical media such that selected portions of the media are physically altered, in order to distort and/or attenuate the transmission of such optical signals to a predetermined degree. The intent of this selective distortion is manifold; namely, to slow the copying process to a desired extent by creating media that generates measurable changes in the system's timing and performance related to how and when data is read in standard optical media drives and copying devices, in a fashion that makes the process of copying the media more time consuming and difficult, as a deterrent to any such copying. The present invention can create instances of optical media that have uniquely identifiable attributes, whose properties are not encoded as data. These properties form a media signature that may be calculated as a metric of optical media drive and/or system and subsystem performance. The principal benefit of these identifying attributes is that since they are induced by physical means, a purely data-driven bit-for-bit copy of a disc cannot represent all of the necessary attributes inherent in the original disc. These attributes include any and all quantifiable behavior and/or performance metrics affected by the use of the selectively deformed media in an optical media drive, and the system in which it resides.

In the inventive methods described herein, a unit of selectively distorted media may be created to return entirely error-free status when reading, or may be created to return desired degrees of error status and degrees of data corruption at specified locations. The degree of distortion is definable on a per-location basis.

In the inventive systems and methods described herein, the techniques involve integrating such selective distortion elements directly into the media at the time it is manufactured (for example as part of the disc pressing and molding process) and/or applying a physical modification to the media following their manufacture, in order to add such selective distortion elements to the media as needed. Depending on the application, either or both approaches may be utilized. The post-manufacture approach involves selective distortion modification to the medium using temperature and/or pressure and/or physical removal of the disc's structure and/or ablation by thermal or chemical or any other technically and commercially viable means for altering the optical properties of the disc to create these regions of selective distortion.

In one embodiment of the present invention, an optical medium is modified by the addition of regions of selective distortion at the time it is manufactured. These regions of selective distortion may be molded into the disc or achieved by the removal or ablation of material. They take the form of concave, convex and/or textural surface modifications in the outer surface of the disc of any size, shape, or depth. They may be on one or both sides of the disc.

In another embodiment of the present invention, an optical medium is modified by the addition of regions of selective deformation following its manufacture, including such modification at a later time in a non-manufacturing setting such as in a retail setting. These regions of selective deformation may be pressed into the disc and or melted into the disc and or abraded from the disc, or achieved by the removal or ablation of material by chemical, thermal, and/or electrical, or other means. The deformation may be applied to one or both sides of the disc, and may take the form of concave, convex and/or textural surface modifications in the outer surface of the disc of any size, shape, or depth. They may be on one or both sides of the disc.

The concave, convex, and/or textural surface or subsurface modifications may be left unfilled and in direct contact with the surrounding atmosphere, or they may be encased beneath a layer of material in order to create a smoothly filled depression, or alternatively a region of encapsulation or capsule region which may be filled as desired with substances that measurably affect optical qualities of the otherwise specification-conformant media structure (for example the focus, the birefringence, the track alignment or apparent track alignment, etc) or that create genuine physical distortions in the track and spiral structure of the disc at that location. Such a region of encapsulation may have a secondary use; if filled with a material that expands and contracts, for example, as a result of temperature change, the shape of the region of distortion may vary over time as the reading laser in the optical media device heats the disc and expands the substance, revealing a measurable variability in distortion properties. The top boundary layer of the distortion regions has selectable surface qualities of transparency, diffraction, diffusion, or partial opacity (for example as a frosted surface does). The size of each of these selective distortion regions may be as small or as large as desired, ranging from single microns to several millimeters, or more. The depth of selective distortion regions may be as great or as small as desired. The quantity of the subsurface modifications or the distortion regions may be selected as desired. They may be placed in any desired location or locations. The distortion regions may selectively damage, or appear to damage, the underlying physical data, depending on the degree of distortion chosen.

The location or locations for placement of the distortion regions may be specified, for example according to Registered Spiral/Data/byte-offset oriented, Registered Polar Coordinate oriented and/or Un-Registered Polar Coordinate oriented methods. Relative distances or data volumes between locations may be specified, as may the degree of distortion which implies a combination of planar and non-planar adjacency of other regions of distortion, the degree of concavity, surface texture, and whether or not the concavity is encapsulated.

Heat, direct and/or indirect, may be applied to an element that serves as a die, and when the desired temperature is reached, the element is pressed into the surface of a media in a specified location at a specified pressure for a specified time, and, as a result, a concavity is created of desired depth, size, and texture. Collections of such die may be manipulated by such a device in an automated fashion to create multiple regions of concavity and distortion at once when pressed into the surface of the media.

Pressure can be applied to an element that serves as a die, the element being pressed into the surface of the media in a specified location for a specified time, and, as a result, a distortion is created of desired depth, size, and texture. Collections of such die may be manipulated by such a device in an automated fashion to create multiple regions of concavity and a complex topological relationship to induce distortion when applied under pressure to the surface of the media.

Ablation of the optical media surface can be is accomplished by chemical, electrical, thermal, or friction (vibratory abrasion, rotary abrasion, linear abrasion) means, and delivered to the surface of the media in a specific location by an element that serves as a die, and, as a result, a distortion is created of desired depth, size, and texture. Collections of such die may be manipulated by such a device in an automated fashion to create multiple regions of such ablation-induced distortion.

The surface texture of the optical media can be modified in selected locations to effect the transmission of light and the optical clarity of the media. Means for inducing such modification may be pressed into the disc and/or melted into the disc and/or abraded from the disc, or achieved by the removal, or ablation of, material by chemical, thermal, and/or electrical means, or other means, on one, or both, sides of the disc.

Any of the modification methods above, including heat, pressure, abrasion, ablation, and surface texture modification, may be used alone, or in combination with each other, on either, or both, surfaces of a unit of optical media.

The size of the region of concavity and/or distortion region may be of a size ranging between single microns, up to tenths of a millimeter, or larger. The affected data can be as small as a single bit or as large as multiple megabytes per concavity and/or distortion region.

Either, or both, surfaces of a unit of optical media may be modified to include these selective distortion regions and/or concavities, regardless of whether the optical media has data on one or both sides. In some cases, the distortion results from optical distortion effects formed on the outer surface, while in others, the distortion is manifested as actual physical track distortion.

Any instance of a location of selective distortion may be of a selectable degree of severity so that the reading device may then respond in the desired fashion when the regions are read, ranging from reading the underlying data with no error or associated slowdown, to being completely unable to read from that location, and all degrees of distortion between these two extremes.

Placement of the selective distortion regions on the optical media may be specifically predetermined or randomly chosen.

The selective distortion regions may be placed in series forming one or more complete rotational spirals around the disc. Such spirals may be perfect spirals or may be imperfect spirals the ends of which meet as a complete circle.

The selective distortion regions may be placed in a designated security section of the disc that contains data that is not part of the actual media title content to be protected, or placed within the standard digital content on the disc, containing data that is part of the actual media title content to be protected, or both.

The selective distortion regions may be placed on the media in order to create a slowdown of the copy process. The effect of the slowdown may be proportional to the severity, size, and number of the selective distortion regions. They may be placed anywhere on the media, either with critical data, or with data the integrity of which is not necessary to preserve during the protection process.

Optical media may alternatively be identified by the accuracy of placement of the selective distortion regions on the media, using either, or both, absolute positioning and/or relative positioning.

Optical media may alternatively be identified by the physical properties imbued to the media by the selective distortion regions on the media, such properties including but not limited to performance metrics, data corruption, and error rate.

The systems and methods of the present invention can be used in conjunction with other copy protection techniques that are used to determine the originality of the disk and to prevent unauthorized copying of content.

The present invention therefore allows for the creation of media whose characteristics under usage in an optical media drive are not determined solely by the encoding of pit-and-land data and associated subcode data, but rather by physical qualities of the total media solution itself including the optical path through the media's first surface which are not duplicable by creating data-only copies of the media. Thus no standard drive or standard media could implement the necessary media attributes (such as selectively distorting the topology or topography of the media's surface in the exact degree and location required to be an identical match) to create a copy that is in all respects identical. Thus a copy created with currently available drive and media components and technologies cannot be mistaken for an original.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention

DETAILED DESCRIPTION OF PREFERRED EMBODIMENTS

Figure 1:
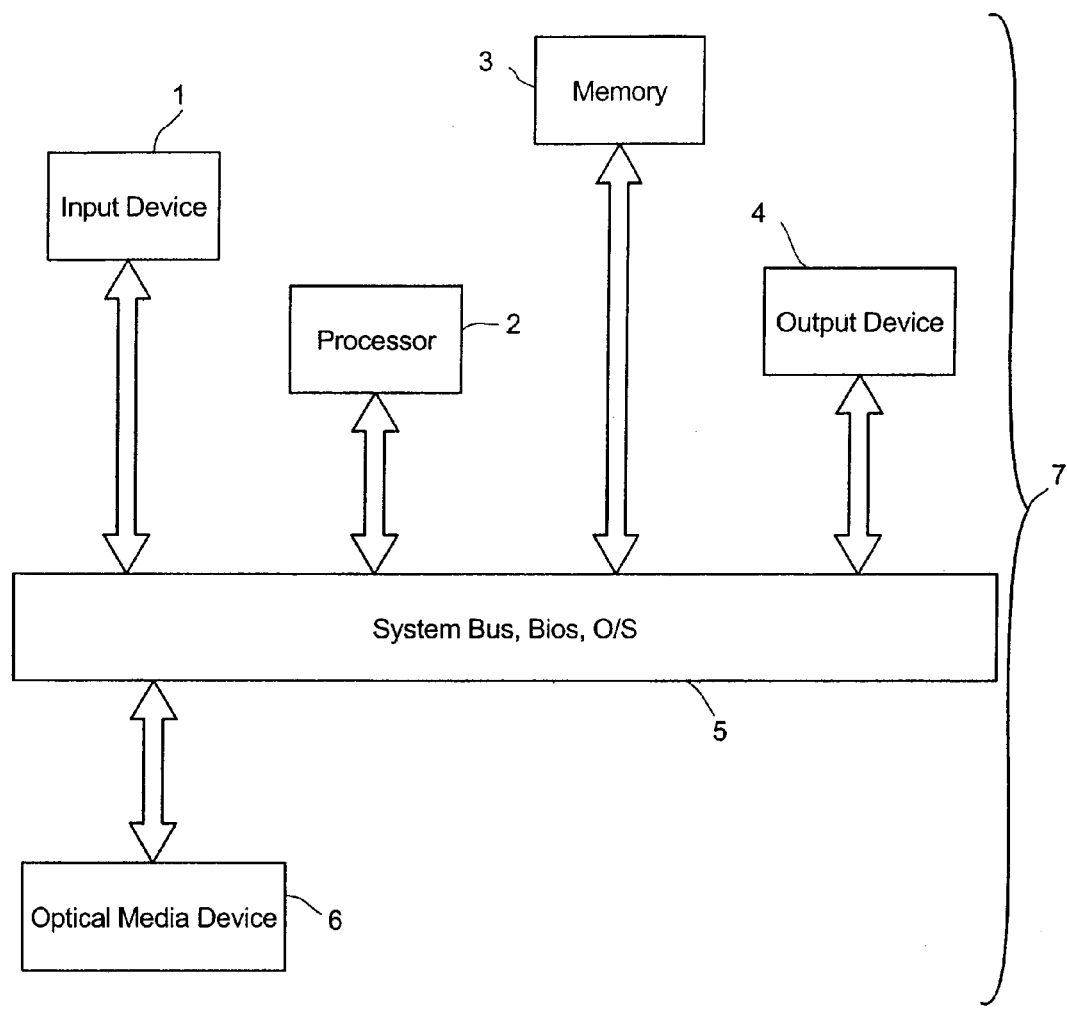
FIG. 1 is a block diagram of a computer system or consumer computerized appliance device including an optical media device, in order to provide an understanding of the interaction of the systems and methods of the present invention with such devices.

The systems and methods of the present invention and its various embodiments may be implemented on a personal computer or general purpose digital computer 7 as shown in FIG. 1, including, but not limited to, single- or multiple-processor-based Windows, Linux or Macintosh desktop computers such as those found with increasing frequency in contemporary homes and offices. Embodiments of the invention may also be implemented on a digital processing circuit, including, but not limited to, those found in CD and DVD consumer audio/video appliance components or systems, game consoles with optical media devices or optical media device support, in stationary and mobile applications. Embodiments of the invention are also well suited for implementation on other computing appliance devices such as hard-disk or random access memory based video and audio entertainment appliances which contain drives capable of reading from and/or writing to optical media, which may be digital-processing-circuit based, or may be based on general-purpose digital computing architectures. In all such cases, an optical medium is at some point inserted into the optical media drive 6 and read, the data flowing through the system bus 5, into memory 3, such data being manipulated by the processor 2 and an eventual result being presented to the user by means of an output device or devices 4.

Figure 2:
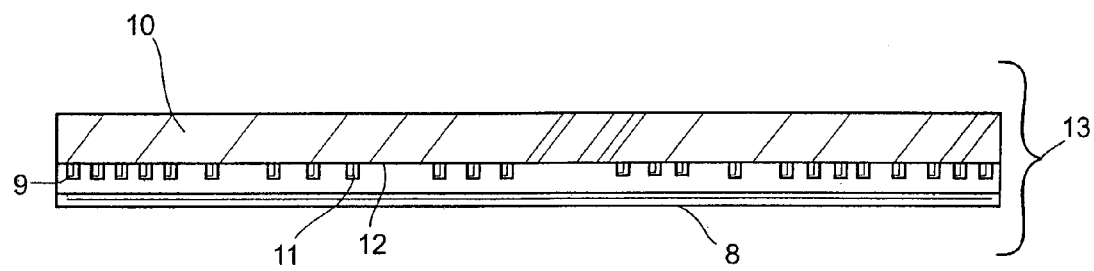
FIG. 2 is a cross-sectional diagram illustrating the structure of single-sided optical media.
Figure 8:
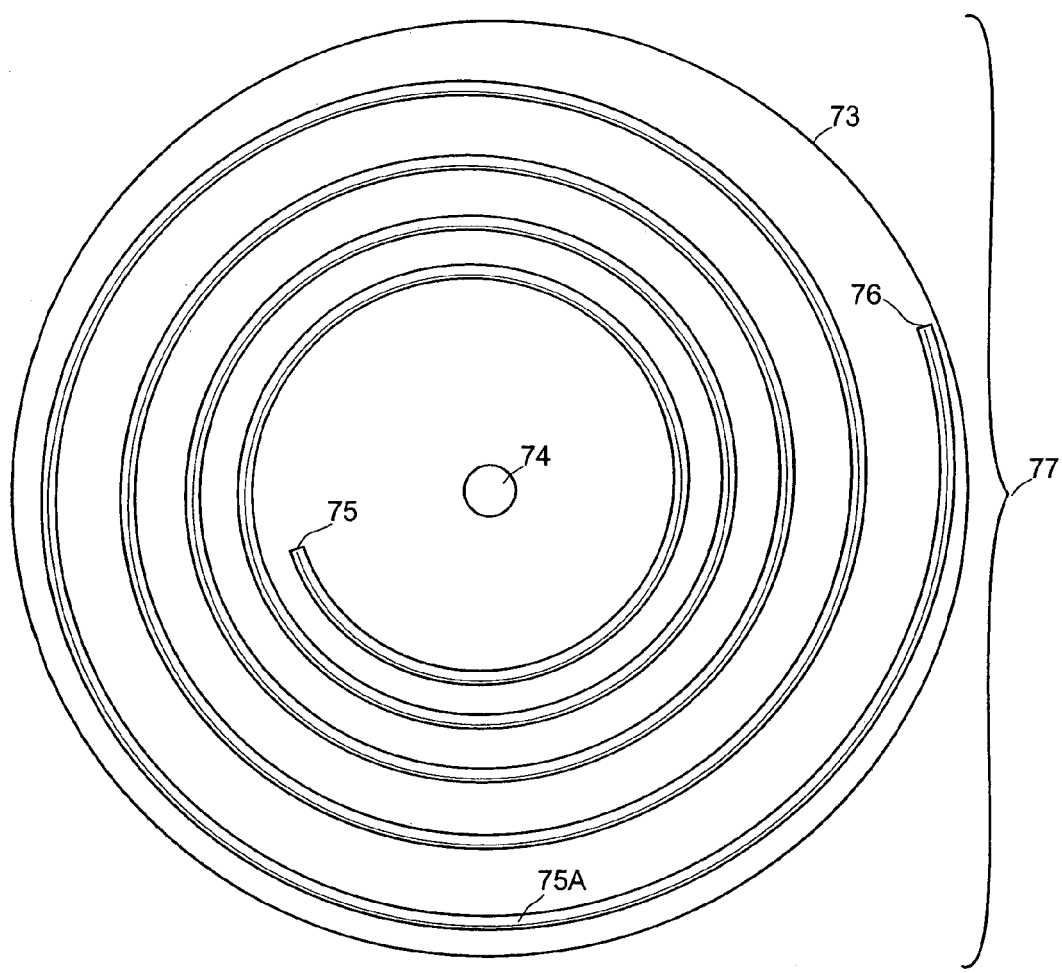
FIG. 8 is a top view of an optical media illustrating the concept of the data spiral.

As shown in FIG. 2 optical media of all types share certain common characteristics that are noted for the purpose of discussing the present invention. They have a first surface, or "reading surface" 10, which is the surface or surfaces closest to the reading head of the device. Beneath the first surface 10 is a layer of physical data representations 9, consisting in this example of pits 11 and lands 12, but any other future optical arrangement of data may be considered in the present invention as well, since the distortion of the reading process is addressed, independent of the actual data representation. These "plateaus and valleys" are often arranged in a spiral on the disc or media 73 as shown in FIG. 8 wherein the starting point 75 of the data is closest to the center of rotation of the disc 74 and the spiral 75A represents a curve of increasing radius that wraps around itself until its end 76. Note that FIG. 8 is illustrative and not intended to be to scale, the spiral is actually single microns in width per rotational curve, and would be too small to represent in its true size. Returning to FIG. 2, such media 13 also have a back, or label, side 8, with appropriately reflective characteristics backed by a protective layer of plastic, lacquer, and/or a label material 8.

Figure 3:
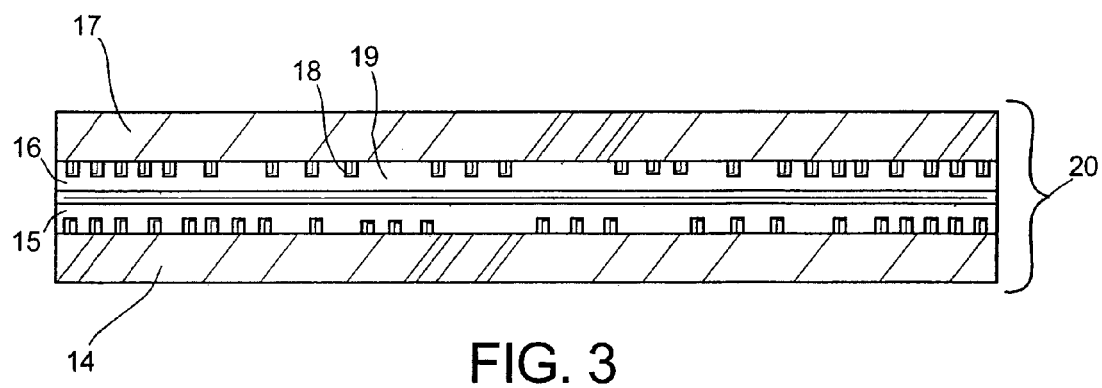
FIG. 3 is a cross-sectional diagram illustrating the structure of double-sided optical media.

FIG. 3 represents a two-sided or dual-sided media 20, including two of the above-mentioned "first surfaces" 14 and 17, one per side and placed back-to-back, with two layers of data representation 15 and 16 including pits 18 and lands 19.

The approach of the present invention involves the manufacture of, or the subsequent modification of, such optical media of FIGS. 2 and 3, such that selected portions of the media are physically altered to distort and/or attenuate the transmission of such optical signals to a predetermined degree. The intent of this selective distortion is manifold; to slow the copying process to a desired extent by creating media that induces measurable changes in the system's timing and performance related to how and when data is read in standard optical media drives and copying devices, in a manner that makes the process of copying the media more time consuming and difficult. In this manner, the present invention operates as a deterrent to unauthorized copying of such media. Instances of optical media are created that have uniquely identifiable attributes, the properties of which are not encoded as data. These properties form a media signature that may be calculated as a metric of optical media drive and/or system and subsystem performance. The principal benefit of these identifying attributes is that since they are induced by physical means, a purely data-driven bit-for-bit copy of a disc cannot represent all of the necessary attributes inherent in the original disc. These attributes include any and all quantifiable behavior and/or performance metrics affected by the use of the selectively deformed media in an optical media drive, and the system in which it resides.

The media signature resulting from the process of deformation has multiple effective benefits that are utilized by this invention. One such benefit that applies to all media types (CD, CD-R, DVD and all other optical media types) and all content types (software, games, audio, video, e-book) is that the deformation can result in significant slowdowns in the copy process; where a fully detailed low-level bit-for-bit copy of an unprotected optical media unit may take 20 or 30 minutes, the same technique can take tens of hours to complete. During this time, system crashes and other issues can render the copy process invalid and require a restart. The inconvenience of this hurdle is significant. When the copy process is complete, in some cases even the best copying tools will indicate to the user that the copy was successful, when in fact the generated copy has a high likelihood of being a corrupted disc image, which will not even mount on a system. Another such benefit which applies to all media types (CD, CD-R, DVD and all other optical media types) and all content types (software, games, audio, video, e-book) is that such media, when selectively deformed, can be recognized and validated algorithmically as the deformity imparts physical characteristics that are not copyable as 1's and 0's and therefore cannot be reproduced on non-deformed output media such as CD-R or other writeable media or on manufactured "glass mastered" media made from a copy. In the case of software and games where the content itself has the ability to execute, such algorithmic authentication can be present on the media itself and tied to the execution of the content. In the case of digital content types which support such non-executable content as movies or audio or e-book data, the component of such an authentication can be present in firmware within the playback device, which, in some cases, will be a device that is in fact a computing device as described in this document which is packaged and sold as a consumer playback appliance. A good example of such a device is a DVD player or game console, which has no or little external programmability and may not even be recognized by the user as a computer. Such firmware would prohibit or refuse the use of any disc that did not have an appropriate selective distortion physical signature.

Figure 4A:
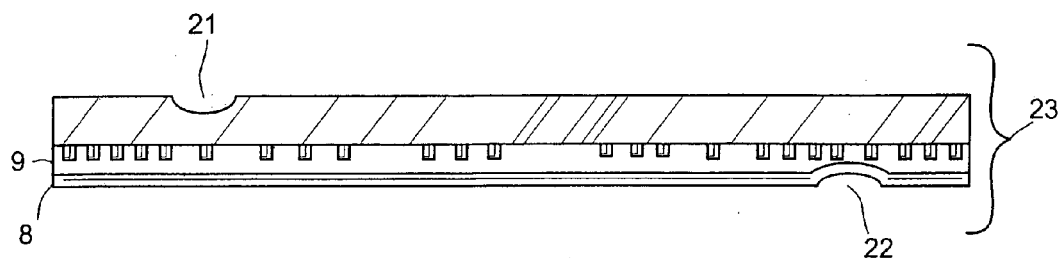
FIGS. 4A–4C are cross-sectional diagrams illustrating instances of concave selective distortion on single-sided optical media, both exposed to the surrounding atmosphere and concealed via a layer of sealant material, in accordance with the present invention.
Figure 4B:
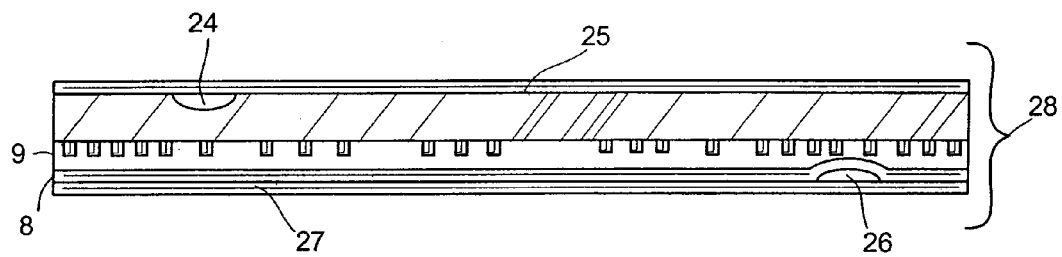
Figure 4C:
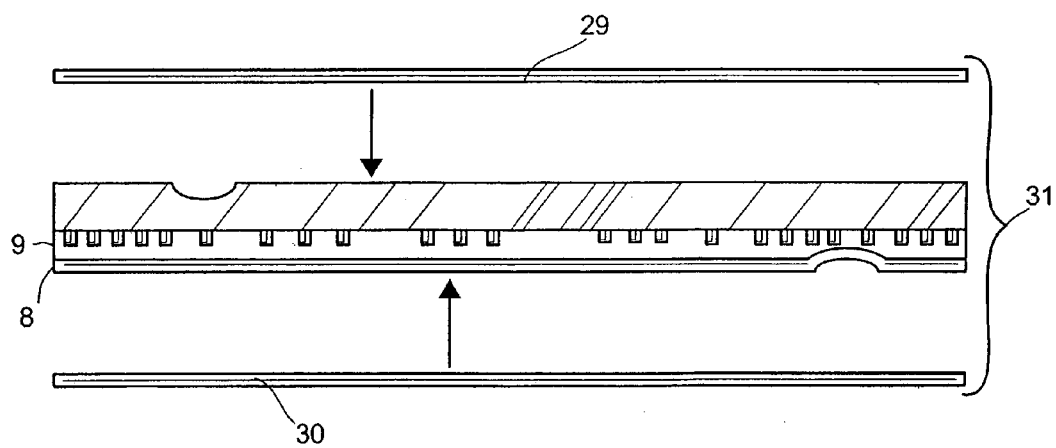

As shown in FIG. 4, the distortion regions 21, 22, 24, 26, whether manufactured into the media or later provided onto a media in a post-manufacture process, yield modified media 23, 28, 31. Such modifications may take the form of a concave indentation 21 of any size in any location on the media's first surface 10, and/or may be a concave indentation 22 on the back, or label, surface 8. The first surface instance 21 affects the media's reading process by producing the appearance of distortion as discussed above. Depending on the degree of selective distortion, the process of reading may be unaffected, or slowed by a predetermined amount or percentage, or may be rendered impossible in certain locations due to the apparent corruption or destruction of the underlying data. Corruption or destruction of the underlying data is apparent, rather than actual, in the case of first surface selective distortion, in the sense that the underlying data is intact and remains correct, but the ability to read the data is reduced or eliminated utterly by the changes in the optical path due to the properties of the distortion. The back side, or label side, instance 22 actually causes real change to the geometry of the physical data an associated tracks. This change is due to the data spirals described above with reference to FIG. 8 being physically bent out of alignment from their expected horizontal plane, causing unexpected focal length and focus issues for the reading device. Such distortion is quite effective and is used sparingly in quantity of locations and degree so that the media is not rendered damaged to a degree so as to be useless. In cases where the media has available space for additional non-critical filler data, the data corresponding with the distortion regions is read, the destructive effect of the distortion regions on the data is monitored, the location of the distortion regions is verified, and the data is discarded. If no extra space for expendable data is available on the media, then lesser degrees of distortion should be chosen in the distortion regions, which can slow the reading of a data bit to a measurable degree, but not change or destroy the underlying associated data.

The simple concave regions of distortion may be further enhanced by providing additional layers of encapsulation 25, 27, which yield encapsulated pockets 24, 26 that may be used to further manifest the distortion effects, for example through the nature of the encapsulation material 25, 27 and/or the nature of the material encapsulated 24, 26, created by the distortion process. Such effects can also include further dynamic physical distortion in the regions 24, 26 caused by the laser pickup of the optical media drive adding heat to the disc during usage and causing the encapsulated regions 24, 26 to expand at a rate that is different than the expansion of the rest of the media, and to further alter the distortion process in a measurable way. Similarly, due to the encapsulated region 26 formed on the back side of the disk, and its associated layer of encapsulation, such distortion of the data can further vary as a result of the temperature change in that region. Such layers of encapsulation 29, 30 may be of any thickness and may cover as much, or as little, of the first surface or the label surface of the disk as desired, and comprise any appropriate material such as transparent or colored plastic, in solid or liquid form attached by any viable adhesive means or molded directly to the surface of the disc itself. Using a colored material has the added advantage of hiding the visible locations of distortion from the eyes of the user, so that the disc, when examined, has no visible surface areas of distortion.

Figure 5A:
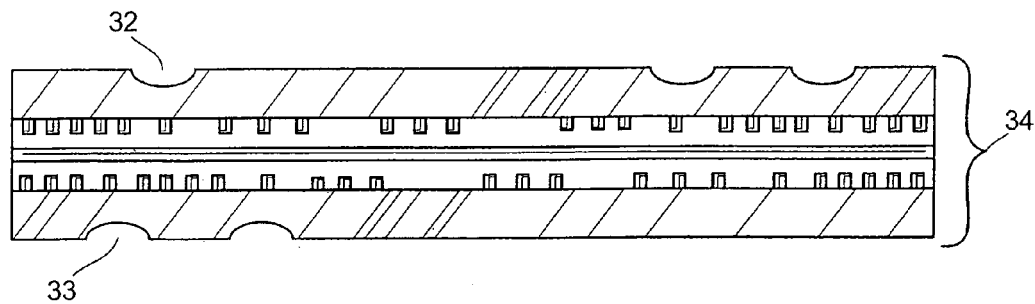
FIGS. 5A–5C are cross-sectional diagrams illustrating instances of concave selective distortion on double-sided optical media, both exposed to the surrounding atmosphere and concealed via a layer of sealant material, in accordance with the present invention.
Figure 5B:
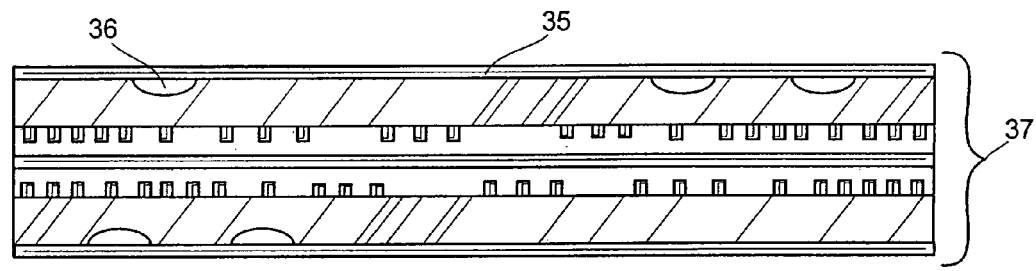
Figure 5C:
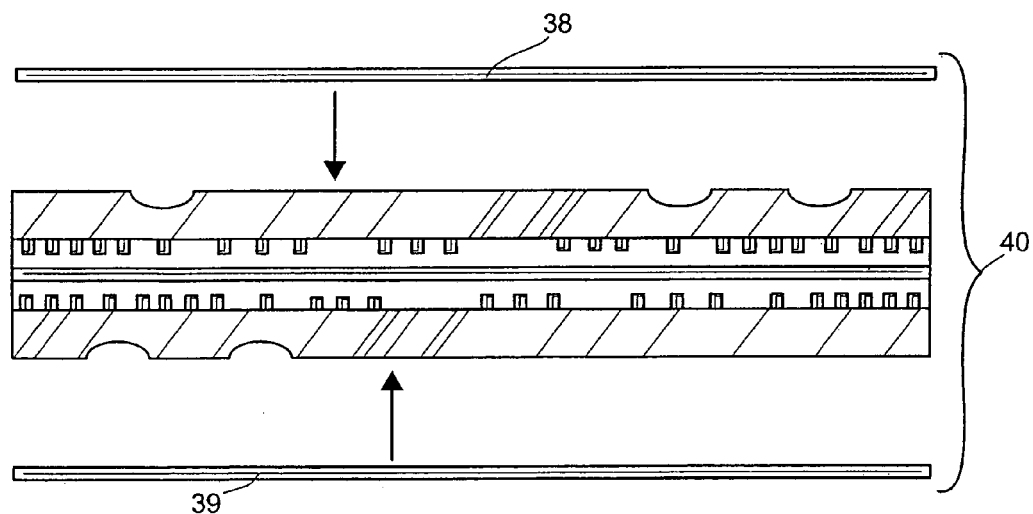

Similarly, on two sided media 34, 37, 40, as shown in FIG. 5, reading surface distortion regions 32 and 33 are formed on either of the viable reading surface sides of the media, and such distortion regions can be further modified by the providing encapsulation layers 35, 38, 39, in order to create encapsulated distortion regions 36 on both sides of the media.

Figure 6A:
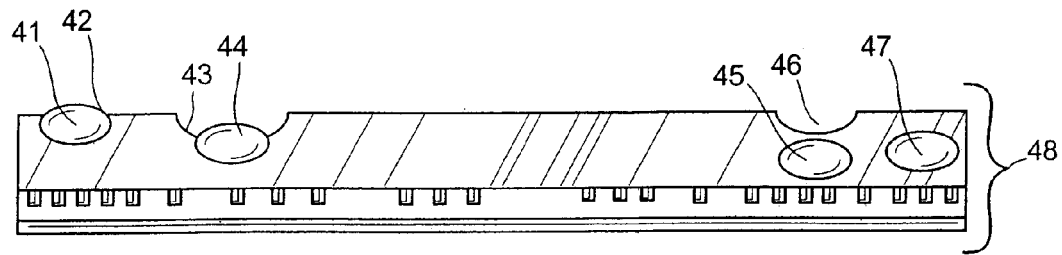
FIGS. 6A–6C are cross-sectional diagrams illustrating instances of complex concave and/or convex selective distortion on single-sided optical media, both exposed to the surrounding atmosphere and concealed via a layer of sealant material, in accordance with the present invention.
Figure 6B:
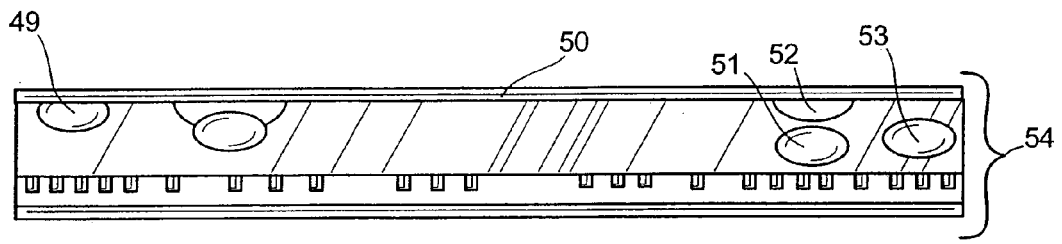
Figure 6C:
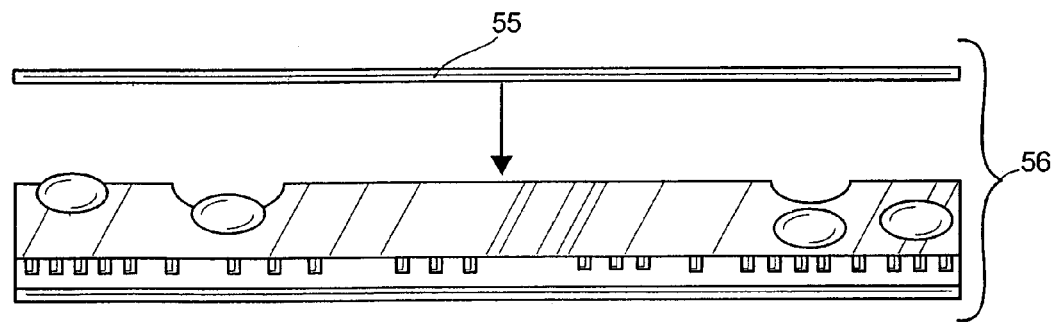

Beyond the concept of simple concave distortion regions, with reference to FIG. 6, the present invention is equally applicable to embodiments that support the creation of more complex regions of selective distortion, which may be manufactured into the media 48, 54, 56, or later applied to the media following manufacture. Such distortion regions may be achieved, for example, by the creation of bubbles 41, 43, 45, 47, 49, 51, 53 within, or beneath, the first or reading surface of the disc regions of encapsulation. The convex surface of the bubbles 41, 43, 45, 47, 49, 51, 53 may be slightly above the reading surface of the disc 42, or may be themselves located within concave distortion regions 43 so that the convex shape 44 of the bubble within the concave distortion region creates a complex system of curved surfaces. Encapsulated bubbles 45 may be placed below concave distortion regions 46 in whole or in part, in order to induce complex optical distortion effects as the region is read by the system. Further such encapsulated bubbles 47 may be formed entirely within the otherwise undistorted first surface of the modified media 48. Such encapsulated bubbles and complex curve systems contained within such complex selective distortion regions may themselves be further encapsulated by an encapsulation layer 50, 55 applied to the surface of the media, which can, in turn, create multiplexed complex encapsulated regions of distortion wherein the encapsulation occurs at the bubble itself 49, or at the complex set of curves above and including the bubble 50, or at the simplex concave location 52 which is entirely above and unconnected to the ovoid bubble 51, or directly above the surface above an entirely contained encapsulated region of distortion created by a bubble amid the first surface 53.

Figure 7A:
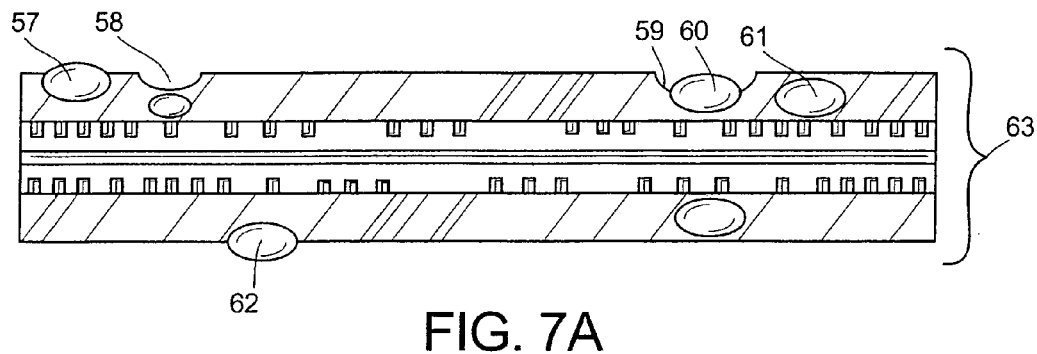
FIGS. 7A–7C are cross-sectional diagrams illustrating instances of complex concave and/or convex selective distortion on double-sided optical media, both exposed to the surrounding atmosphere and concealed via a layer of sealant material, in accordance with the present invention.
Figure 7B:
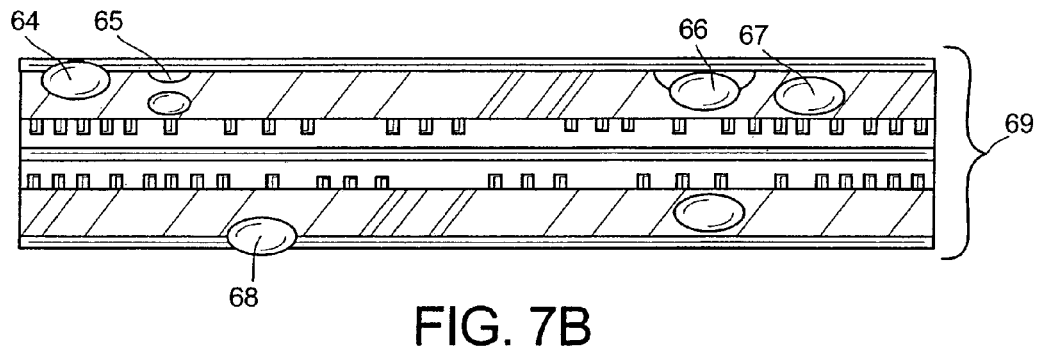
Figure 7C:
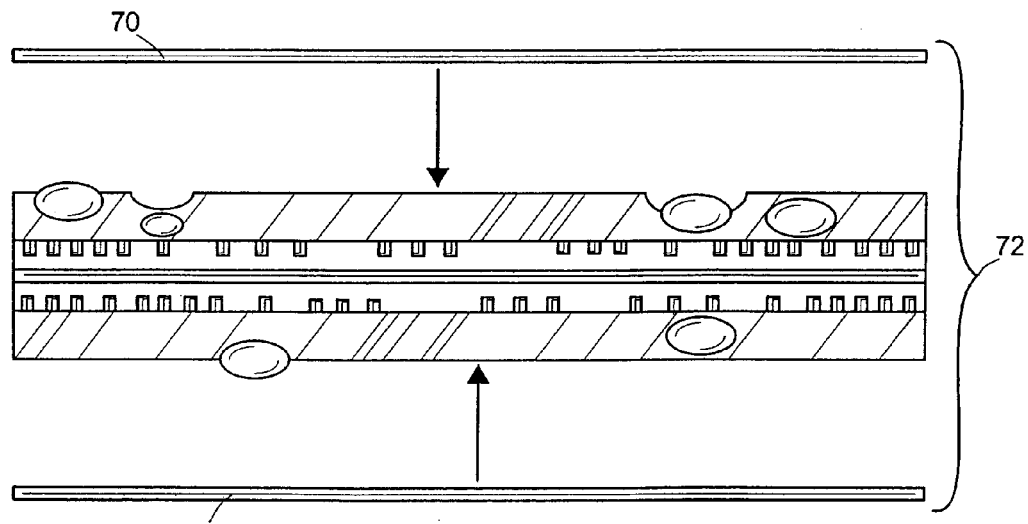

As shown in FIG. 7, such complex selective distortion effects can be achieved on two-sided media 63, 69, 72 using similar constructs; near-surface bubbles 57, 62 representing encapsulated selective distortion regions, bubbles entirely beneath concave distortion regions 58, or complex surface curvature shapes produced by the intersection of encapsulated bubbles and their convex outer shape 60 and a concave simple regions of selective distortion 59. Such selective distortion regions may further be enhanced by the addition of layers of encapsulation 70, 71 which can create additional encapsulated regions 64, 65, 66, 68 which may themselves impart measurable distortion effects, or be effected by thermal change to cause measurably altered distortion effects.

In the inventive systems and methods described herein, a unit of selectively distorted media may be created at the time of manufacture, or in a post-manufacture process, to return entirely error-free status when reading, or may be created to return desired degrees of error status and degrees of partial or complete data corruption at specified locations. The degree of distortion is definable on a per-location basis. This ability to vary the degree of distortion between locations supports the ability to encode meaningful data not only by means of location but also by the degree of distortion found in each location. For example if a certain unit of media had three locations of distortion, for example at byte offset 1000, 2000 and 3000, then finding those locations might serve to validate the media. However, if those locations had known degrees of distortion, such that the location 1000 had a minor amount of distortion which slowed the read process somewhat, and the location 2000 had severe distortion that disallowed the reading process, and location 3000 had moderate distortion also slowing the read process to a predetermined degree, then the relationships of the degree of distortion combined with the relationships of the locations can be used to represent an encoding value that is unique and measurable with repeatability across a wide range of reading optical media devices.

Figure 15A:
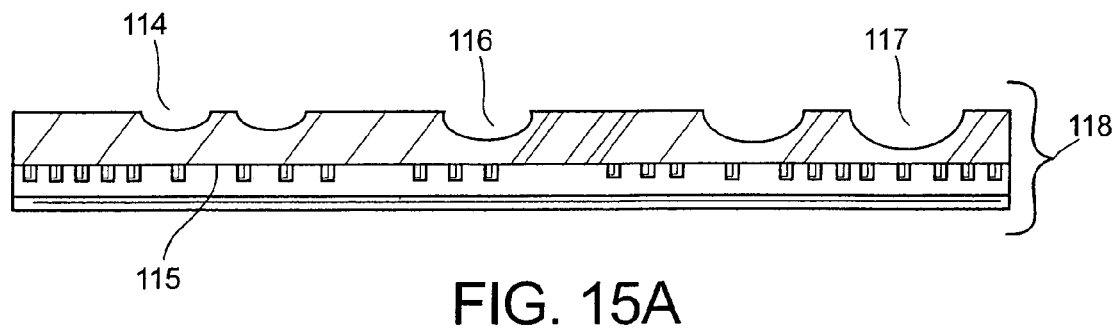
FIGS. 15A–15C are side views illustrating means for controlling the degree of selective distortion according to the severity of concavity in the surface of the media, in accordance with the present invention.
Figure 15B:
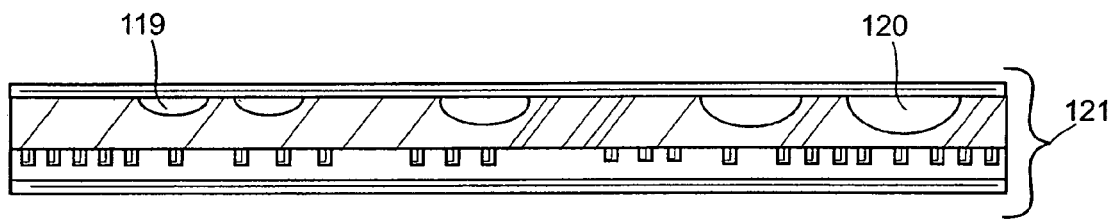
Figure 15C:
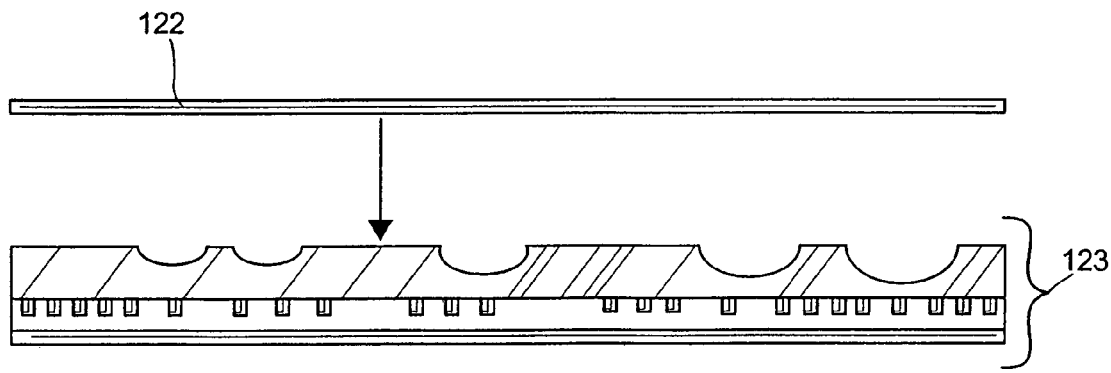

As shown in FIG. 15, the extent of selective distortion may be controlled be in its simplest form, the concave dimple or distortion region, by controlling the degree of the topological complexity. For example, a subtle concave indentation distortion region 114 may result in minor, or no, noticeable change in the quality or quantity of data read from the disc. As the degree of indentation increases 116, the level of difficulty in extracting data from that location increases. A maximum amount of distortion can also be reached 117, after which the region is severely damaged and can no longer be used to read valid data. There are many degrees of control within this range. Further enhancement of control over the degree of distortion effects may be accomplished by encapsulating these regions of selective distortion 119, 120 on encapsulated media 121, 123 by the addition of a layer of encapsulation 122, as explained above.

In the inventive methods described herein, the techniques involve integrating such selective distortion elements directly into the media at the time of manufacture (for example as part of the disc pressing and molding process) and/or applying a physical mechanism and process to the media disks following manufacture to add these selective distortion elements to the media as needed. Applications may include the former, the latter, or both, in combination. Such a physical device component of the present invention that applies selective distortion modification to the medium after it has been manufactured will be discussed that uses temperature, pressure, physical removal of the disc's structure, and/or ablation by thermal or chemical or any other technically and commercially viable means as a means of altering the optical properties of the disc to create these regions of selective distortion. Simple or complex patterns of surface curvature and texture can be created, and subsurface bubbles inserted into the disk material. In all such cases, these distortion regions may be placed in randomly chosen locations on the disc and later located by means of a broad data-reading search technique across the disc, or may be placed in predetermined specific desired locations. The means of specifying such locations may either be data oriented or physical-structure oriented, or both.

One such method treats the spiral data structure shown in FIG. 8 as a stream of bytes beginning with the first byte of the disc 75 and ending with the last byte 76. Such mapping is done between this data spiral 75A and physical disc location using physical methods that include Polar methods shown in FIG. 9 and Cartesian methods shown in FIG. 10.

Figure 9:
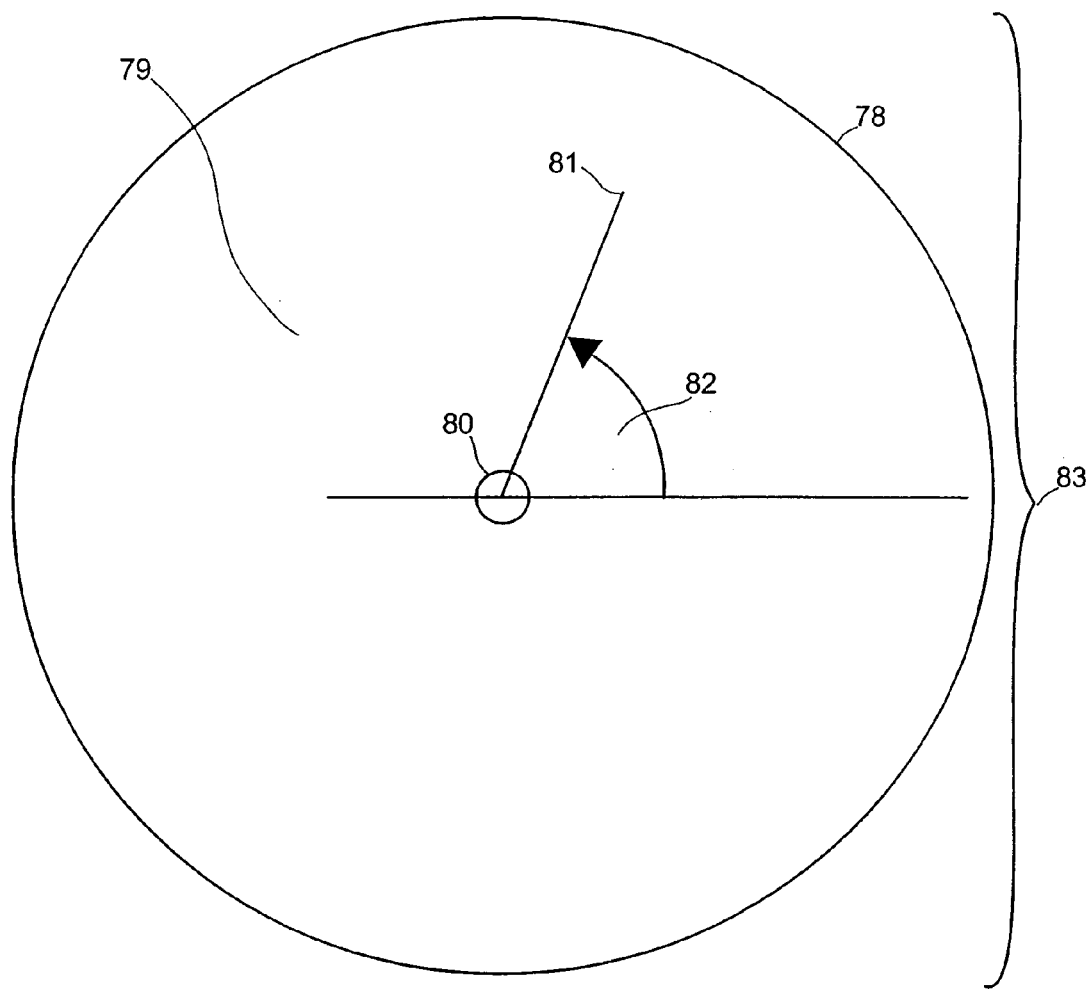
FIG. 9 is a top view of an optical media illustrating the use of Polar coordinates to physically map disc locations for the application of regions of selective distortion.
Figure 10:
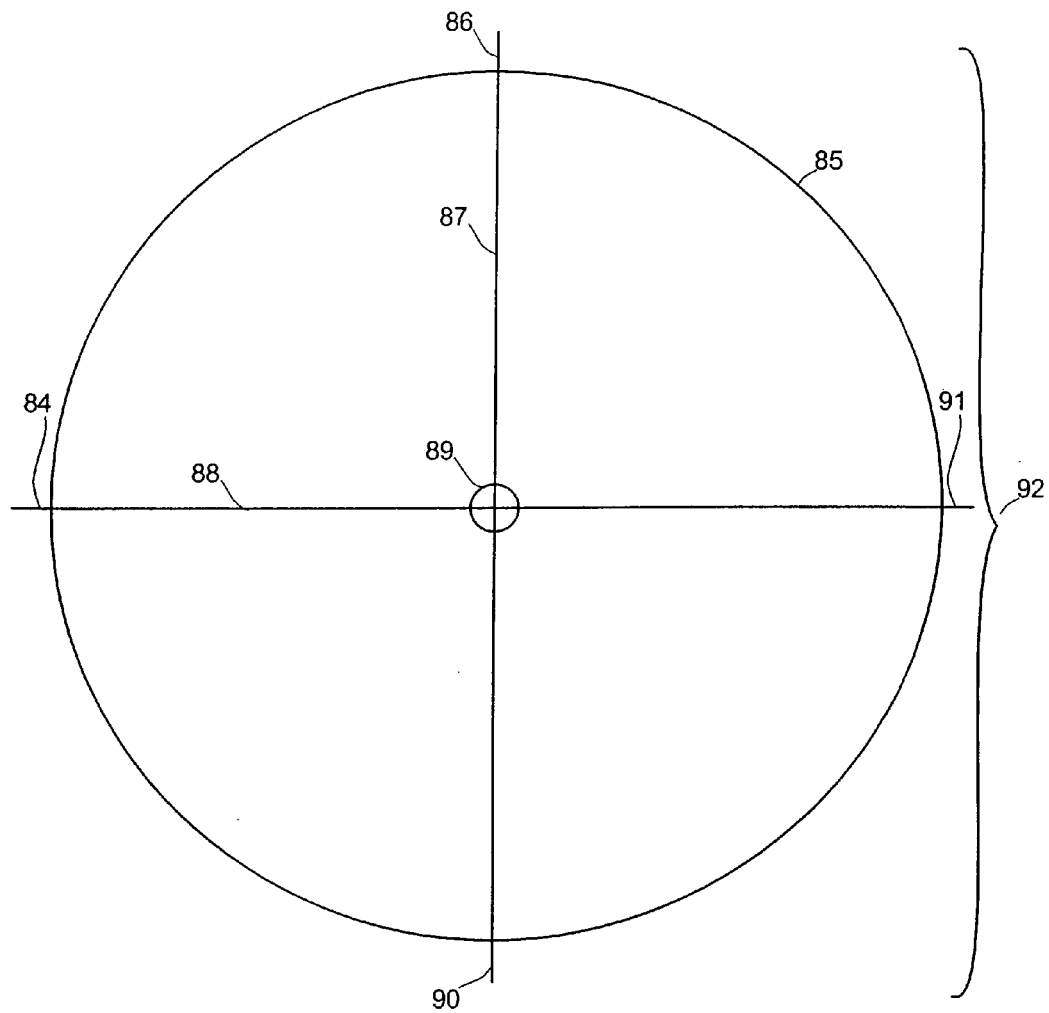
FIG. 10 is a top view of an optical media illustrating the use of Cartesian coordinates to physically map disc locations for the application of regions of selective distortion.

As in FIG. 9 the Polar formula for the physical location defined by the origin and rotational center of the disc 80 and the degree of rotation 82 from a specified origin line to a point location 81 describes a unique location that corresponds to a data location on the previously described spiral 75A from the origin at location 75 through the outermost location 76. That location is uniquely described as Point (81,82). Similarly, the Cartesian method of location definition as described in FIG. 10 accomplishes the same correspondence between the data location and a physical location on the media. Rectangular coordinate space is defined on the disc with each point of a two dimensional matrix being defined to correspond with a data location on the previously described spiral 75 through 76. Two Cartesian axes are defined 87, 88 and a zero point is defined at the rotational center of the disc 89. Each such axis has positive and negative coordinates. X-axis 88 has negative coordinates from the zero point 84 ranging to the farthest horizontal negative location on the disc 84, and has a positive range from the center zero point 89 to the farthest horizontal positive point 91. The vertical axis 87 similarly has a negative value range from the zero point 89 through the farthest vertical negative disc location 90, and a corresponding positive range from the zero point 89 to the farthest positive vertical location 86. Thus a unique point corresponding to a known data location on the spiral represented between points 75 through 76 may be expressed using this method as Point (88[value], 87[value]) where the value is the positive or negative axis range value for that location.

In an embodiment of this invention, optical media is modified by the addition of regions of selective distortion at the time it is manufactured. These regions of selective distortion may be molded into the disc or achieved by the removal or ablation of material. They take the form of indentations or dimples in the outer surface of the disc of any size, shape, or depth. They may be located on one or both sides of the disc. This may be accomplished by modifying the standard media molding equipment to include such simple or complex shapes as surface treatments, and by further modifying these machines to add an optional layer of encapsulation to the media.

Figure 11:
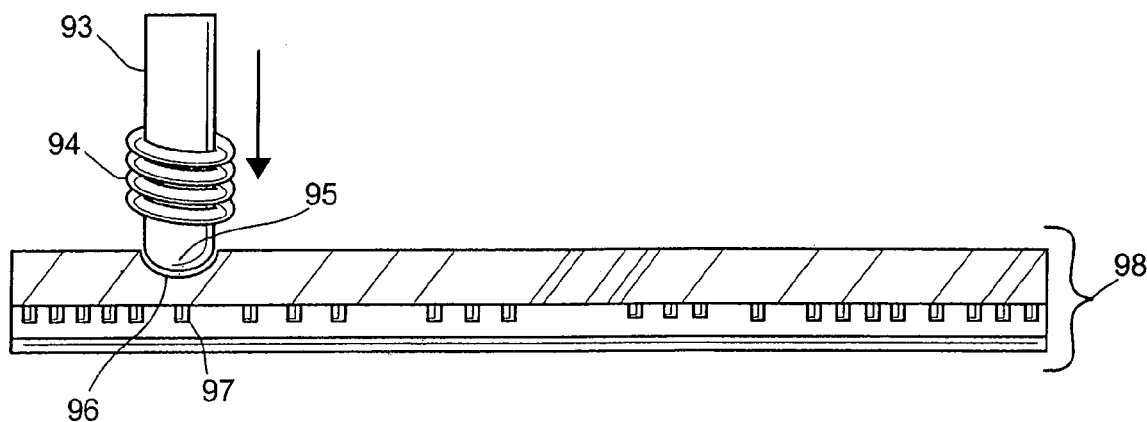
FIG. 11 is a side view of a component that induces selective distortion into media by applying thermal energy and controlled pressure, in accordance with the present invention.

As shown in FIG. 11 the media 98 may be modified to include regions of selective distortion 96 by the application of one or more heated device dies 93, heated by means of a heating element 94, with an appropriately curved and textured surface 95. This heating element 93 is maintained at an appropriate temperature in order to soften the media enough to allow the heating element 93 to be pressed into the media surface with an appropriate applied pressure for an appropriate amount of time to create the selective distortion region 96 as desired above the recorded data 97.

Figure 12:
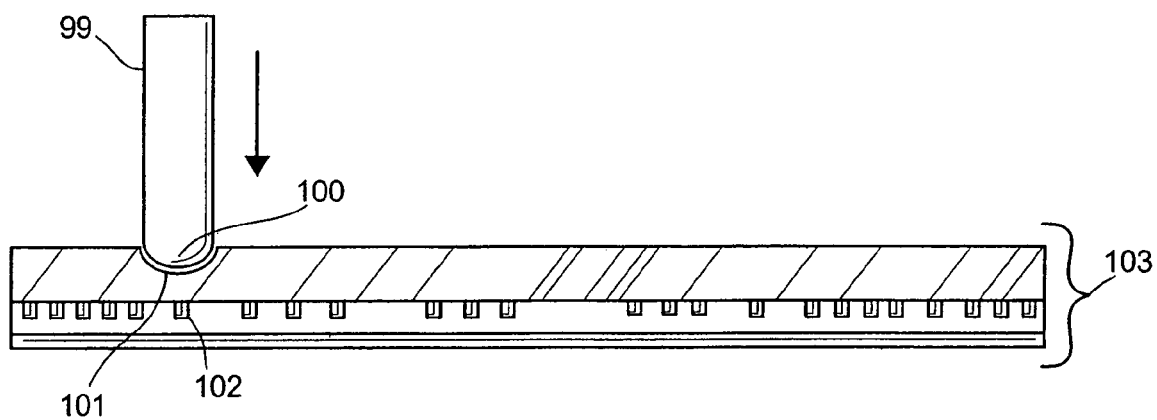
FIG. 12 is a side view of a component that induces selective distortion into media by means of controlled pressure, in accordance with the present invention.

As shown in FIG. 12 the present invention also allows for the creation of regions of selective distortion on media 103 without the application of heat, simply by applying an appropriate amount of pressure. A die 99 is urged into the desired location such that the tip 100 of the die is pressed into the media 103 to create the desired degree of distortion 101 above the recorded data 102.

Figure 13:
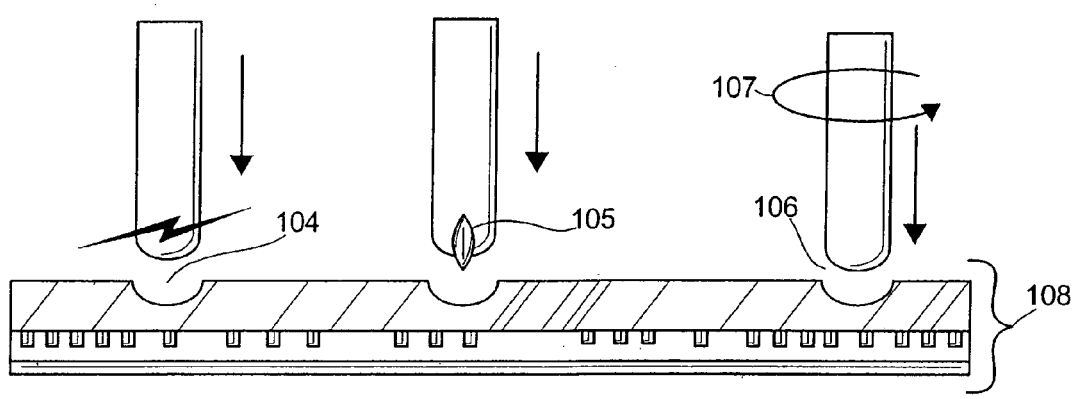
FIG. 13 is a side view of components that induce selective distortion into media by means of electrical discharge, ablative/solvent/caustic material application, heat or thermal change and/or vibration/rotation/friction, in accordance with the present invention.

As shown in FIG. 13 the present invention is further applicable to other means for the creation of regions of selective distortion on a media 108. For example, a die 104 having the ability to discharge electricity as an arc may be used to ablate or soften the surface of the media, and the tip of the die 104 may be used to further indent the surface and produce the desired shape and texture of the distortion region. Alternatively, a chemical or other material science related means 105 may be used in the application of solvents or other chemicals to soften, cloud, distort, or ablate surfaces of the media 108 as desired. A die 106 rotatably driven by a drill 107 can be used to create a distortion region when applied into the surface of the media 108. Vibratory, or other, motion, may alternatively be imparted 107 to the die 106 to generate the desired effect. Friction-related techniques may be applied to cause the surface of the media to embody regions of selective distortion. These techniques may be combined to create the desired complex shapes. In addition to complex surface topology changes being introduced by such means, encapsulated regions or bubbles may be induced below the surface by such combinational means, for example the chemical or substance delivery method in 105 can deliver a solvent, followed by delivering a charge of compressed air, then the electric method shown in 104 can be used to fuse the surface and press a concave distortion region over it, yielding an encapsulated complex region of distortion as shown in FIG. 6, elements 45 and 46.

Figure 14:
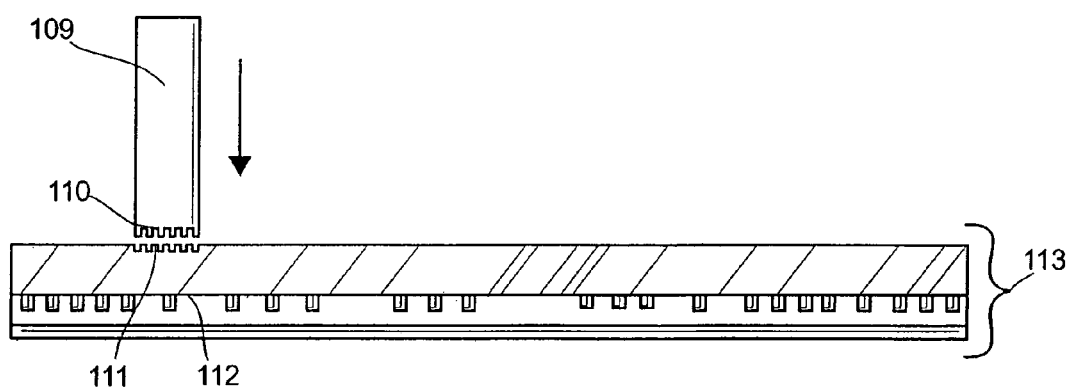
FIG. 14 is a side view of a mechanism that modifies the surface of media to alter its texture and thereby alter certain optical characteristics, in accordance with the present invention.

In addition to the providing of complex surface topological changes described above, the present invention is further applicable to the creation of distortion regions by altering the surface texture of the first surface or reading surface of the media. As shown in FIG. 14 the surface 111 of a media 113 may be modified to alter its texture by pressing a textured die 109 into it (or by molding such a texture into it at the time of manufacture). The die 109 includes an appropriate tip shape and texture 110, and is pressed into the media 113 using temperature 95, pressure 100, or the other techniques 104, 105, 106 described above to induce a region of surface texture change 111, which differs from the standard smooth optically near-perfect surface texture found on most optical media. Such texture changes can be induced by any combination of textured molds, textured die surfaces, heat, pressure, chemistry, electricity or other techniques used in the manufacture or subsequent modification of optical media.

Figure 16:
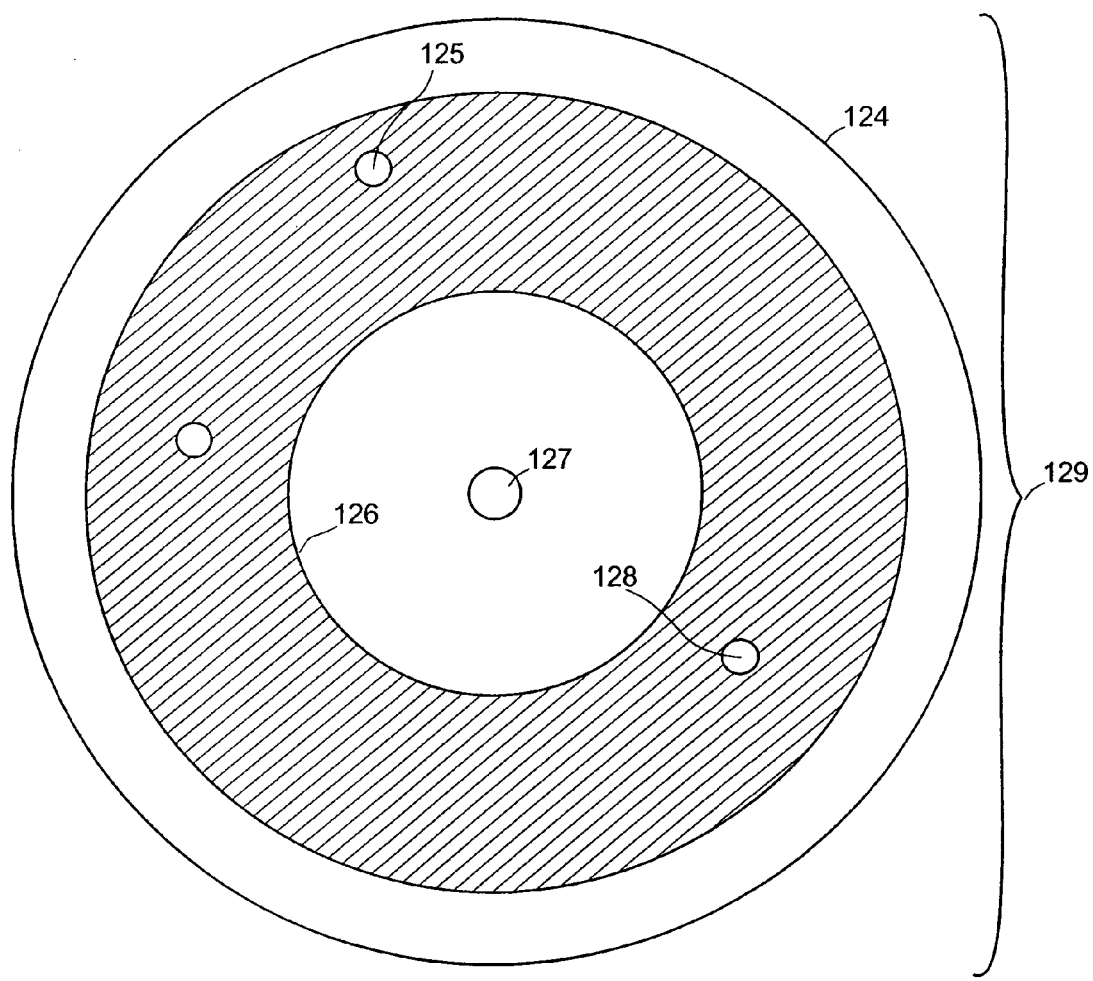
FIG. 16 is a top view of illustrating a region of the disc used for the application of selective distortion without concern for data integrity in that region, in accordance with the present invention.

As shown in the top view of FIG. 16 the media 129 may be modified using any of the means described above to produce one or more regions of selective distortion 125, 128. Such a disc may be composed entirely of critical data which is needed for the usage of the disc in its entirely, or may have certain data present 126 which is considered to be expendable and may be sacrificed where regions of extreme selective distortion are required. In general, any or all of the regions of an optical media may be used to place selective distortion regions. In the case of media wherein the entire content is non-expendable, it is advisable to use only mild to moderate distortion values so that no data is actually destroyed. In the case of media that includes unused space, for example a 400 MB product on a 650 MB capacity disc, it would be recommended to add 250 MB of data to the disc to allow for additional areas of distortion, to serve as a copy deterrent by significantly slowing the copy process due to the distortion slowdown effect, and to serve as significant areas of additional distortion to allow for the encoding of additional authentication information across these areas by virtue of their relative and absolute locations and the degree of distortion found there. Such expendable data areas allow for the use of severe distortion which further slows the copy process and also allows for a greater range of encoding values based on the degree of distortion.

Selective distortion regions may be placed in series forming one or more complete rotational spirals around the disc. Such spirals may be perfect spirals or may be imperfect spirals, the ends of which meet as a complete circle or ring.

Optical media can be modified by the addition of selective deformation regions at any time during its manufacture, including modification at a later time in a non-manufacturing setting such as a retail setting. These regions of selective deformation may be pressed into the disc and or melted into the disc and or abraded from the disc, or achieved by the removal or ablation of material by chemical, thermal, electrical, and/or other means. They may be on one or both sides of the disc. They take the form of concave, convex, and/or textural surface modifications in the outer surface of the disc of any size, shape, or depth. They may provide on one or both sides of the disc.

In the exemplary embodiments described above, such concave, convex, or textural surface or subsurface modifications may be left unfilled and in direct contact with the surrounding atmosphere, or they may be encased beneath a layer of material in order to create a smoothly filled depression, or alternatively an area of encapsulation or capsule region which may be filled as desired with substances that measurably affect optical qualities of the otherwise specification-conformant media structure (for example the focus, the birefringence, the track alignment or apparent track alignment, etc) or that create genuine physical distortions in the track and spiral structure of the disc at that location. Such a region of encapsulation may have a secondary use; if filled with a material that expands and contracts, for example, as a result of temperature change, the shape of the region of distortion may vary over time as the reading laser in the optical media device heats the disc and expands the substance, altering the disc's surface slightly, revealing a measurable variability in distortion properties. Thus as a given spot is read and re-read, it will heat up, expanding the trapped gas, in this example the surrounding atmosphere present in the manufacturing facility (for example air) which was trapped during the manufacture process and this temperature change and corresponding pressure change results in a change to the convex and/or concave surface properties of the area of distortion thereby changing the degree of distortion, so that on subsequent repeated reads the measurable amount of distortion can be shown to change in a predictable manner. Once the repeated reading process stops for a predetermined period of time, the media will cool in the selected area, and the gas will contract, causing the area of distortion to return to its original surface topology, and a subsequent re-read at that location will yield the original distortion value. This process of re-reading and forced heating and cooling of repeatedly read locations can be repeated reliably to ensure correct identification of the distorted area.

The top boundary layer including concave, convex, and/or texture-altered surface regions of distortion has selectable surface qualities of transparency, diffraction, diffusion, and refraction. The size of each of these regions of selective distortion may be as small or large as desired, and can range from single microns to several millimeters or more. The depth of these regions of selective distortion may be as great or small as desired. The quantity of these concave, convex, textural surface, and/or subsurface modifications or regions of distortion may be as many or as few as desired. They may be placed in any location or locations as desired. The regions of distortion may, or may not, selectively damage or appear to damage the underlying physical data, depending on the degree of distortion chosen.

The location or locations for any such region of selective distortion may be specified. There are multiple mechanisms for specifying the locations; Registered Spiral/Data/byte-offset oriented and/or Registered Polar Coordinate oriented and/or Un-Registered Polar Coordinate oriented methods. Relative distances or data volumes between locations may be specified, as may the degree of distortion (which implies a combination of planar and non-planar adjacency of other regions of distortion, the degree of concavity, surface texture, and whether or not the concavity is encapsulated).

Heat, direct and/or indirect, can be applied to an element that serves as a die, and when the desired temperature is reached, the element is pressed into the surface of the media in a specified location at a specified pressure for a specified time, and, as a result, a concavity is created of desired depth, size, and texture. Collections of such die may be manipulated by such a device in an automated fashion to create multiple regions of concavity and distortion at once when pressed into the surface of the media.

Pressure can be applied to an element that serves as a die, and the die applied to the surface of the media in a specified location for a specified time, and as a result a concavity is created of desired depth, size, and texture. Collections of such die may be manipulated by such a device in an automated fashion to create multiple regions of concavity and distortion at once when pressed into the surface of the media.

Ablation of the optical media surface can be accomplished by chemical, electrical, thermal, or friction (vibratory abrasion, rotary abrasion, linear abrasion) means, and delivered to the surface of the media in a specific location by an element that serves as a die, and as a result a concavity is created of desired depth, size, and texture. Collections of such die may be manipulated by such a device in an automated fashion to create multiple regions of such ablation-induced concavity and distortion.

The surface texture of optical media can be modified in selected locations to effect the transmission of light and the optical clarity of the media. Such modifications may be pressed into the disc, melted into the disc, or abraded from the disc, or achieved by the removal or ablation of material by chemical, thermal, or electrical and/or other means, on one or both sides of the media.

Any of the above modification approaches, heat, pressure, abrasion, ablation, or surface texture, modification may be used in combination with each other, on one or both surfaces of a unit of optical media.

The size of the region of concavity and/or distortion may be of a size on the order of one micron or single micron increments from one micron up to the order of tenths of a millimeter or larger. The data affected can be as small as a single bit or as large as multiple megabytes per concavity and/or distortion region.

Either or both surfaces of a unit of optical media may be modified to include such regions of selective distortion and or concavity, whether or not the optical media has data recorded on one or two sides. In some cases the distortion results from optical distortion effects on the outer surface, while in others the distortion is manifested as actual physical track distortion.

Any instance of a location of selective distortion may be of a selectable degree of severity so that the reading device may then respond in the desired fashion when the regions are read, ranging from reading the underlying data with no error or slowdown associated, to being completely unable to read from that location, and all degrees of distortion-related effects between these two extremes.

Regions of selective distortion can be placed in specific predetermined positions or random locations on the optical media. They can be placed in a designated security section of the disc that contains data that is not part of the actual media title content to be protected, and/or placed within the standard digital content on the disc, containing data that is part of the actual media title content to be protected.

The selective distortion regions may be placed on the media in order to create a slowdown of the copy process. The slowdown is proportional to severity, size, and number of regions of selective distortion. They may be placed anywhere on the media, either with critical data or with data whose integrity it is not necessary to preserve during the protection process.

Optical media may be identified by the accuracy of placement of regions of selective distortion on the media, either or both using absolute positioning and/or relative positioning. Alternatively, optical media may be identified by the physical properties imbued to the media by the regions of selective distortion on the media, such properties including but not limited to performance metrics, data corruption, and/or error rate.

The inventive concepts discussed above can be used in conjunction with other copy protection methods that are used to determine the originality of the disk and prevent copies.

While this invention has been particularly shown and described with references to preferred embodiments thereof, it will be understood by those skilled in the art that various changes in form and details may be made herein without departing from the spirit and scope of the invention as defined by the appended claims.

We claim:

1. A method for determining authenticity of an optical medium comprising:

modifying an optical path of the optical medium, the optical medium including a first layer adjacent a data layer, the modifying of the optical path of the optical medium comprising:

selecting a region of the first layer to be distorted; and prior to a reading operation of the medium, distorting the region of the first layer, the distorted region extending in a direction along a track of the data layer;

performing a reading operation of the optical medium, the distorted region modifying the reading operation of data stored in the data layer corresponding to the distorted region, such that when data stored in the data layer corresponding to the distorted region is read, a measurable change in system performance of the reading operation results and the ability to perform the reading operation in the distorted region is maintained with at least one of error-free status and degrees of error status that indicates an avoidance of complete data corruption while slowing down the reading operation process, the distorted region maintaining its optical characteristics following irradiation of the distorted region during the reading operation;

detecting the measurable change in system performance that occurs during the reading operation that is maintained during reading of the distorted region, wherein the measurable change in system performance is based on timing of the reading operation;

authenticating the optical medium based on the measurable change in the system performance.

2. The method of claim 1 wherein the first layer comprises a reading layer through which the optical path is directed.

3. The method of claim 2 wherein the optical medium further comprises a back layer adjacent the data layer, opposite the reading layer.

4. The method of claim 3 wherein selecting a region and distorting the region are further performed on the back layer.

5. The method of claim 1 wherein the first layer comprises a back layer.

6. The method of claim 5 wherein the optical medium further comprises a reading layer adjacent the data layer, the reading layer opposite the back layer.

7. The method of claim 6 wherein selecting a region and distorting the region are further performed on the reading layer.

8. The method of claim 1 wherein selecting comprises selecting a predetermined region of the first layer.

9. The method of claim 1 wherein selecting comprises selecting a random region of the first layer.

10. The method of claim 1 wherein distorting comprises distorting the region of the first layer such that the optical path of incident light in the distorted region for reading the corresponding data in the data layer is modified.

11. The method of claim 1 wherein distorting comprises forming an indentation in an outer surface of the first layer.

12. The method of claim 11 further comprising encapsulating the indentation.

13. The method of claim 12 wherein encapsulating comprises providing a second layer on the first layer and the indentation.

14. The method of claim 11 wherein forming an indentation comprises forming multiple indentations of multiple depths in the first layer.

15. The method of claim 1 wherein distorting comprises providing a convex feature at the first layer.

16. The method of claim 15 wherein the convex feature extends from an outer surface of the first layer.

17. The method of claim 15 wherein the convex feature is embedded within the first layer.

18. The method of claim 15 further comprising encapsulating the convex feature with a second layer provided on the first layer and the convex feature.

19. The method of claim 15 wherein distorting further comprises forming an indentation in an outer surface of the first layer, and wherein the convex feature is provided within the indentation.

20. The method of claim 15 wherein distorting further comprises forming an indentation in an outer surface of the first layer, and wherein the convex feature is embedded within the first layer below the indentation.

21. The method of claim 15 wherein providing a convex feature comprises forming multiple convex features of multiple thicknesses at the first layer.

22. The method of claim 15 wherein the convex features comprise voids formed in the first layer.

23. The method of claim 1 wherein distorting comprises altering an outer surface of the first layer in the region.

24. The method of claim 23 wherein altering comprises altering the texture of the outer surface.

25. The method of claim 1 wherein distorting the region of the first layer is conducted during manufacture of the optical medium.

26. The method of claim 1 wherein distorting the region of the first layer is conducted following manufacture of the optical medium.

27. The method of claim 1 wherein distorting is conducted by a distorting technique selected from the group of techniques consisting of: pressure, heat, chemical, electrical, friction, and drilling.

28. The method of claim 1 wherein the optical medium is a dual-sided medium having dual opposed data layers and first layers.

29. An optical medium having a modified optical path for authenticating of the optical medium comprising:

a first layer adjacent a data layer; and a distorted region formed at the first layer prior to a reading operation of the medium such that a reading operation of data stored in the data layer corresponding to the distorted region is modified, such that when data stored in the data layer corresponding to the distorted region is read in a reading operation, a measurable change in system performance of the reading operation results and the ability to perform a reading operation in the distorted region is maintained with at least one of error-free status and degrees or error status that indicates an avoidance of complete data corruption while slowing down the reading operation process, the measurable change in system performance being based on timing of the reading operation, the distorted region extending in a direction along a track of the data layer, the distorted region maintaining its optical characteristics following irradiation of the distorted region during the reading operation.

30. The optical medium of claim 29 wherein the first layer comprises a reading layer through which the optical path is directed.

31. The optical medium of claim 30 wherein the optical medium further comprises a back layer adjacent the data layer, opposite the reading layer.

32. The optical medium of claim 31 wherein a distorted region is further provided on the back layer.

33. The optical medium of claim 29 wherein the first layer comprises a back layer.

34. The optical medium of claim 33 further comprising a reading layer adjacent the data layer, the reading layer opposite the back layer.

35. The optical medium of claim 34 wherein a distorted region is further provided on the reading layer.

36. The optical medium of claim 29 wherein the distorted region is provided at a predetermined location.

37. The optical medium of claim 29 wherein the distorted region is provided at a location that is randomly generated.

38. The optical medium of claim 29 wherein the distorted region distorts the first layer such that the optical path of incident light in the distorted region for reading the corresponding data in the data layer is modified.

39. The optical medium of claim 29 wherein the distorted region comprises an indentation in an outer surface of the first layer.

40. The optical medium of claim 39 further comprising a second encapsulation layer on the first layer and the indentation.

41. The optical medium of claim 39 wherein the indentation comprises multiple indentations of multiple depths in the first layer.

42. The optical medium of claim 29 wherein the distorted region comprises a convex feature at the first layer.

43. The optical medium of claim 42 wherein the convex feature extends from an outer surface of the first layer.

44. The optical medium of claim 42 wherein the convex feature is embedded within the first layer.

45. The optical medium of claim 42 wherein the convex feature is encapsulated by a second layer provided on the first layer and the convex feature.

46. The optical medium of claim 42 wherein the distorted region further comprises an indentation formed in an outer surface of the first layer, and wherein the convex feature is provided within the indentation.

47. The optical medium of claim 42 wherein the distorted region comprises an indentation formed in an outer surface of the first layer, and wherein the convex feature is embedded within the first layer below the indentation.

48. The optical medium of claim 42 wherein the convex feature comprises multiple convex features of multiple thicknesses at the first layer.

49. The optical medium of claim 42 wherein the convex features comprise voids formed in the first layer.

50. The optical medium of claim 29 wherein the distorted region comprises an alteration of an outer surface of the first layer in the region.

51. The optical medium of claim 50 wherein the alteration comprises an alteration in the texture of the outer surface.

52. The optical medium of claim 29 wherein the distorted region is formed during manufacture of the optical medium.

53. The optical medium of claim 29 wherein the distorted region is formed following manufacture of the optical medium.

54. The optical medium of claim 29 wherein the distorted region is formed by a distorting technique selected from the group of techniques consisting of: pressure, heat, chemical, electrical, friction, and drilling.

55. The optical medium of claim 29 wherein the optical medium is a dual-sided medium having dual opposed data layers and first layers.

56. A method for determining authenticity of an optical medium, comprising:
modifying an optical path of an optical medium, the optical medium including a first layer adjacent a data layer comprising:
selecting a region of the first layer to be distorted; and
prior to a reading operation of the medium, distorting the region of the first layer by applying a permanent physical distortion to the medium in the first layer, to provide a distorted region in the first layer that modifies the optical path of the medium, the distorted region extending in a direction along a track of the data layer,
performing a reading operation of the optical medium, the distorted region modifying the reading operation of data stored in the data layer corresponding to the distorted reaion, such that when data stored in the data layer corresponding to the distorted region is read, a measurable change in system performance of the reading operation results and the ability to perform the reading operation in the distorted region is maintained with at least one of error-free status and degrees of error status that indicates an avoidance of complete data corruption while slowing down the reading operation process, the distorted region maintaining its optical characteristics following irradiation of the distorted region during the reading operation;
detecting the measurable change in system performance that occurs during the reading operation that is maintained during reading of the distorted region, wherein the measurable change in system performance is based on timing of the reading operation;
authenticating the optical medium based on the measurable change in the system performance.

57. An optical medium having a modified optical path for authenticating of the optical medium comprising:
a first layer adjacent a data layer; and
a distorted region formed at the first layer prior to a reading operation of the medium by applying a permanent physical distortion to the medium in the first layer, to provide a distorted region in the first layer that modifies the optical path of the medium such that a reading operation of data stored in the data layer corresponding to the distorted region is modified, such that when data stored in the data layer corresponding to the distorted region is read in a reading operation, a measurable change in system performance of the reading operation results and the ability to perform a reading operation in the distorted region is maintained with at least one of error-free status and degrees of error status that indicates an avoidance of complete data corruption while slowing down the reading operation process, the measurable change in system performance being based on timing of the reading operation, the distorted region extending in a direction along a track of the data layer, the distorted region having permanent optical characteristics as a result of the physical distortion that are maintained following irradiation of the distorted region during the reading operation.

58. The method of claim 56, wherein distorting comprises forming an indentation in an outer surface of the first layer.

59. The method of claim 58 further comprising encapsulating the indentation.

60. The method of claim 59 wherein encapsulating comprises providing a second layer on the first layer and the indentation.

61. The method of claim 58 wherein forming an indentation comprises forming multiple indentations of multiple depths in the first layer.

62. The method of claim 56, wherein distorting comprises providing a convex feature at the first layer.

63. The method of claim 62 wherein the convex feature extends from an outer surface of the first layer.

64. The method of claim 62 wherein the convex feature is embedded within the first layer.

65. The method of claim 62 further comprising encapsulating the convex feature with a second layer provided on the first layer and the convex feature.

66. The method of claim 62 wherein distorting further comprises forming an indentation in an outer surface of the first layer, and wherein the convex feature is provided within the indentation.

67. The method of claim 62 wherein distorting further comprises forming an indentation in an outer surface of the first layer, and wherein the convex feature is embedded within the first layer below the indentation.

68. The method of claim 62 wherein providing a convex feature comprises forming multiple convex features of multiple thicknesses at the first layer.

69. The method of claim 62 wherein the convex features comprise voids formed in the first layer.

70. The optical medium of claim 57, wherein the distorted region comprises an indentation in an outer surface of the first layer.

71. The optical medium of claim 62 further comprising a second encapsulation layer on the first layer and the indentation.

72. The optical medium of claim 62 wherein the indentation comprises multiple indentations of multiple depths in the first layer.

73. The optical medium of claim 57, wherein the distorted region comprises a convex feature at the first layer.

74. The optical medium of claim 73 wherein the convex feature extends from an outer surface of the first layer.

75. The optical medium of claim 73 wherein the convex feature is embedded within the first layer.

76. The optical medium of claim 73 wherein the convex feature is encapsulated by a second layer provided on the first layer and the convex feature.

77. The optical medium of claim 73 wherein the distorted region further comprises an indentation formed in an outer surface of the first layer, and wherein the convex feature is provided within the indentation.

78. The optical medium of claim 73 wherein the distorted region comprises an indentation formed in an outer surface of the first layer, and wherein the convex feature is embedded within the first layer below the indentation.

79. The optical medium of claim 73 wherein the convex feature comprises multiple convex features of multiple thicknesses at the first layer.

80. The optical medium of claim 73 wherein the convex features comprise voids formed in the first layer.

* * * * *

UNITED STATES PATENT AND TRADEMARK OFFICE
CERTIFICATE OF CORRECTION

PATENT NO. : 7,376,073 B2
APPLICATION NO. : 10/023424
DATED : May 20, 2008
INVENTOR(S) : John J. Hart, III et al.

It is certified that error appears in the above-identified patent and that said Letters Patent is hereby corrected as shown below:

Column 19, line 41 delete "reaion" and insert --region--

Signed and Sealed this

Third Day of March, 2009

JOHN DOLL
*Acting Director of the United States Patent and Trademark Office*